United States Patent [19]
Gotou et al.

[11] Patent Number: 5,729,102
[45] Date of Patent: Mar. 17, 1998

[54] BRUSHLESS MOTOR

[75] Inventors: Makoto Gotou, Nishinomiya; Kazushige Narazaki, Katano; Tomokuni Iijima, Moriguchi, all of Japan

[73] Assignee: Matsushita Electric Industrial Co., Ltd., Osaka-fu, Japan

[21] Appl. No.: 673,399

[22] Filed: Jun. 28, 1996

[30] Foreign Application Priority Data

Jun. 30, 1995 [JP] Japan ................................. 7-165060

[51] Int. Cl.$^6$ ................................................ H02P 7/00
[52] U.S. Cl. ..................................... 318/254; 318/439
[58] Field of Search ........................... 318/254, 439, 318/138, 632, 63, 64, 57, 58, 60, 61

[56] References Cited

U.S. PATENT DOCUMENTS

| | | | |
|---|---|---|---|
| 5,047,699 | 9/1991 | Rozman | 318/254 |
| 5,155,419 | 10/1992 | Naito. | |
| 5,311,105 | 5/1994 | Nakai et al. . | |
| 5,339,012 | 8/1994 | Schroedl et al. | 318/254 |
| 5,608,300 | 3/1997 | Kawabata et al. | 318/721 |
| 5,612,605 | 3/1997 | Tao | 318/805 |
| 5,635,810 | 6/1997 | Goel | 318/719 |

FOREIGN PATENT DOCUMENTS 04222487  8/1992  Japan.
04295294  10/1992  Japan.

*Primary Examiner*—Jonathan Wysocki
*Attorney, Agent, or Firm*—Panitch Schwarze Jacobs & Nadel, P.C.

[57] ABSTRACT

The brushless motor has: a field unit having a rotor permanent magnet (12); three-phase driving windings (20A, 20B, and 20C) of the stator; driving transistors for supplying a power to the driving windings; a driving command unit (43) for generating sinusoidal driving command signals; and a driving unit which supplies to the driving windings sinusoidal driving currents in accordance with the driving command signals. The driving command unit (43) consists of: a time interval measurement device (42) which measures timing intervals from a pulse signal of a rotation detector (41), the timing intervals being inversely proportional to the rotational speed of the rotor; and a driving command generation unit (43) which changes an estimated electric angle at time intervals responding to the measurement result of the time interval measurement device thereby to generate the sinusoidal driving command signals corresponding to the estimated electric angle.

18 Claims, 22 Drawing Sheets

F I G. 5
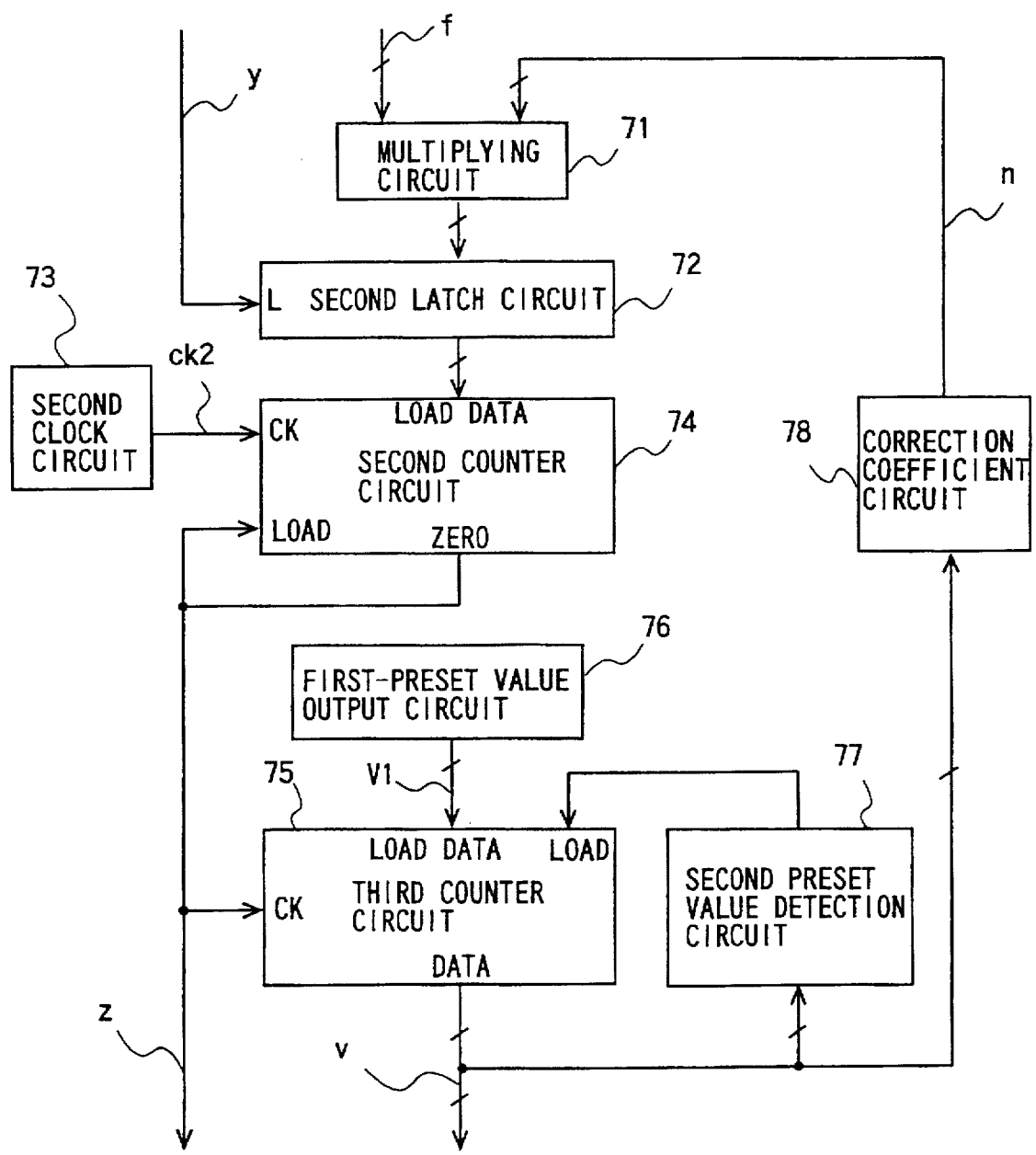

BRUSHLESS MOTOR

FIELD OF THE INVENTION AND RELATED ART STATEMENT

1. Field of the Invention

The invention relates to a brushless motor wherein a substantially sinusoidal driving current is supplied in synchronization with rotation of rotor.

2. Description of the Related Art

Recently, many brushless motors are used which detects the rotational position of the rotor and switches currents to be supplied to the driving windings, thereby conducting the rotation driving in a predetermined direction.

FIG. 23 shows the configuration of a prior art brushless motor. A position detector 502 consists of an optical rotary encoder which is disposed so as to be coaxial with a rotor magnet 501. The optical rotary encoder has three photocouplers respectively consisting of light emitting diodes 503a, 503b, and 503c, and phototransistors 504a, 504b, and 504c. An optical slit 505 is disposed between the light emitting diodes and the respective phototransistors so that the position of the optical slit 505 is changed as the rotor magnet 501 is rotated, thereby changing the outputs of the phototransistors 504a, 504b, and 504c. The output currents of the phototransistors 504a, 504b, and 504c are converted into three-phase detection voltages by resistors 507a, 507b, and 507c. Comparators 510a, 510b, and 510c compare the detection voltages of the respective phases with a reference voltage of a reference voltage source 508 and generate three-phase digital signals. The output digital signals from the comparators 510a, 510b, and 510c are amplified by amplifiers 511a, 511b, and 511c and then applied to the three-phase driving windings 520a, 520b, and 520c.

In accordance with rotation of the rotor magnet 501, the position of the optical slit 505 is changed so that the output digital signals of the comparators 510a, 510b, and 510c are changed. As a result, the driving voltages applied to the driving windings 520a, 520b, and 520c are switched and a torque in a predetermined direction is continuously generated.

However, such a configuration of the prior art has the following problems.

First, in the prior art configuration, since the position detector which detects the rotational position of the rotor and which has a relatively simple structure is used, the power supply to the driving windings is conducted by means of a rectangular voltage. As a result, the currents are distorted by the inductances of the windings so that the driving torque is largely varied. Furthermore, the current distortion due to the digital voltage switching causes the motor to vibrate and produces noises, thereby producing large problems.

Second, since the position detector has an optical rotary encoder configured by the three light emitting diode, three phototransistors and the optical slit, the position detector has a large number of parts and wirings, thereby making the mass-production of the position detector very cumbersome. The parts for position detection which are disposed in the vicinity of the rotor magnet and the driving windings are used in a severe environment which has a high temperature and is dusty. Therefore, it is preferable to reduce the parts to a number as small as possible.

OBJECT AND SUMMARY OF THE INVENTION

It is a primary object of the invention to provide a brushless motor which can solve the first problem of the prior art and supply a sinusoidal driving current by using a rotary detector having a simple structure. It is another object of the invention to provide a brushless motor which can solve the first and second problems and supply a sinusoidal driving current by using a rotary detector having a very simplified structure.

In the brushless motor of the invention, timing intervals of a pulse signal which is synchronized with rotation of the rotor are measured, an estimated electric angle is estimated at estimating time intervals according to the measurement result, and substantially sinusoidal driving currents corresponding to the estimated electric angle are supplied to the driving windings. Therefore, adverse current distortion due to the winding inductance exerts a very small influence. Therefore, a driving torque which is less varied, namely is uniform, is obtained. Accordingly, the motor is smoothly rotated and vibration and noises of the motor are reduced to a very low level. Furthermore, the pulse signals for detecting rotation can be reduced in number, and hence it is possible to employ a rotation detector with a reduced number of parts and a simple structure.

In order to achieve the above-mentioned object, the brushless motor in accordance with the present invention comprises:

a field means having a permanent magnet type rotor for producing P field poles (P is an even number integer not less than 2);

K-phase driving windings (K is an integer not less than 2) fixed to a stator;

driving commanding means for generating a substantially sinusoidal driving command signal; and driving control means for supplying a substantially sinusoidal driving current to the driving windings responding to the driving command signal, the driving commanding means comprising:

rotation detecting means for obtaining a pulse signal in synchronization with rotation of the rotor;

time interval measurement means for measuring a timing interval of the pulse signal; and driving command generating means for estimating an estimated electric angle at an estimating interval shorter than the timing interval and responsive to a measurement result of the time interval measurement means, and generating the substantially sinusoidal driving command signal corresponding to the estimated electric angle.

In order to achieve the above-mentioned object, another aspect of the brushless motor in accordance with the present invention comprises:

a field means having a rotor for producing P field poles (P is an even number not less than 2);

K-phase driving windings (K is an integer not less than 2) fixed to a stator;

driving commanding means for generating a substantially sinusoidal driving command signal; and driving control means for obtaining a current feedback signal corresponding to a current supplied to the driving windings, and supplying a substantially sinusoidal driving current to the driving windings in accordance with a result of comparison between the driving command signal and the current feedback signal, the driving commanding means comprising:

rotation detecting means for obtaining a pulse signal in synchronization with rotation of the rotor;

time interval measurement means for measuring a timing interval of the pulse signal;

electric angle estimating means for obtaining a generated timing signal at a time interval responding to the measurement result of the time interval measurement means, and estimating the estimated electric angle responding to generation of the generated timing signal; and command generating means for generating the substantially sinusoidal driving command signal corresponding to the estimated electric angle;

deviation amount detecting means for detecting a deviation of the estimated electric angle from a predetermined value at a timing of the pulse signal in the rotation detecting means; and deviation correcting means for, in accordance with the deviation, correcting the time interval of the generated timing signal.

In order to achieve the above-mentioned object, still other aspect of the brushless motor in accordance with the present invention comprises:

a field means having a permanent magnet type rotor for producing P field poles (P is an even number not less than 2), K-phase driving windings (K is an integer not less than 2) fixed to a stator;

current commanding means for generating a current command signal;

current detecting means for obtaining a current feedback signal corresponding to a current supplied to the driving windings;

transforming and comparing means for comparing the current feedback signal with the current command signal; and driving control means for supplying a substantially sinusoidal driving current to the driving windings in accordance with an output signal of the transforming and comparing means, the transforming and comparing means comprising:

rotation detecting means for obtaining a pulse signal in synchronization with rotation of the rotor;

time interval measurement means for measuring a timing interval of the pulse signal;

electric angle estimating means for obtaining a generated timing signal at a time interval responding to a measurement result of the time interval measurement means, and estimating an estimated electric angle responding to generation of the generated timing signal;

transform feedbacking means for obtaining a transformed feedback signal by operating coordinate transformation on the current feedback signal with the estimated electric angle;

control signal generating means for obtaining a control signal responding to a result of comparison between the transformed feedback signal and the current command signal;

transformed control signal generating means for obtaining a transformed control signal which is obtained by operating coordinate transformation on the control signal with the estimated electric angle; and output generating means for obtaining the output signal responding to the transformed control signal.

According to these configurations, a new estimated electric angle is sequentially obtained at time intervals synchronized with rotation of the rotor, by using only the pulse signal of the rotation detection means. While conducting the generation of the driving command signal, or the coordinate transformation by using the electric angle, the sinusoidal driving command signal corresponding to the estimated electric angle is supplied. Even when the rotor is rotated at a higher or lower speed, therefore, the electric angle can be correctly estimated so that the supply of a sinusoidal driving current synchronized with the rotational position is realized. Since a substantially sinusoidal driving current is supplied to the driving windings in this way, the driving current is smoothly changed and hence the current distortion due to the winding inductance is reduced to a very small level. Consequently, a driving torque which is less varied or is uniform is obtained, with the result that the motor is smoothly rotated and vibration and noises of the motor are reduced to a very low level.

The pulse signal of the rotation detection means is not always required for three phases. Even when only one pulse signal is used, the invention can be configured. Consequently, parts which are to be disposed in the vicinity of the driving windings can be largely reduced in number, and hence the rotation detection means can have a simple structure. In the specification, an electric angle of 360 degree corresponds to two poles of the field unit. And the terms of a sinusoidal driving command signal and a sinusoidal driving current mean that the driving command signal and the driving current vary sinusoidally in response to the change of the electric angle.

Further in this invention, the words "substantially sinusoidal" includes not only sinusoidal, but also like-sinusoidal, or analogously sinusoidal, or effectively sinusoidal, or nearly sinusoidal, etc., which will give similar or effectively analogous works to sinusoidal.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 5 is a circuit diagram of an electric angle estimator 44 of the first embodiment.

It will be recognized that some or all of the Figures are schematic representations for purposes of illustration and do not necessarily depict the actual relative sizes or locations of the elements shown.

DESCRIPTION OF THE PREFERRED EMBODIMENTS

[Embodiment 1]

Hereinafter, an embodiment of the invention will be described with reference to the accompanying drawings.

Figure 1:
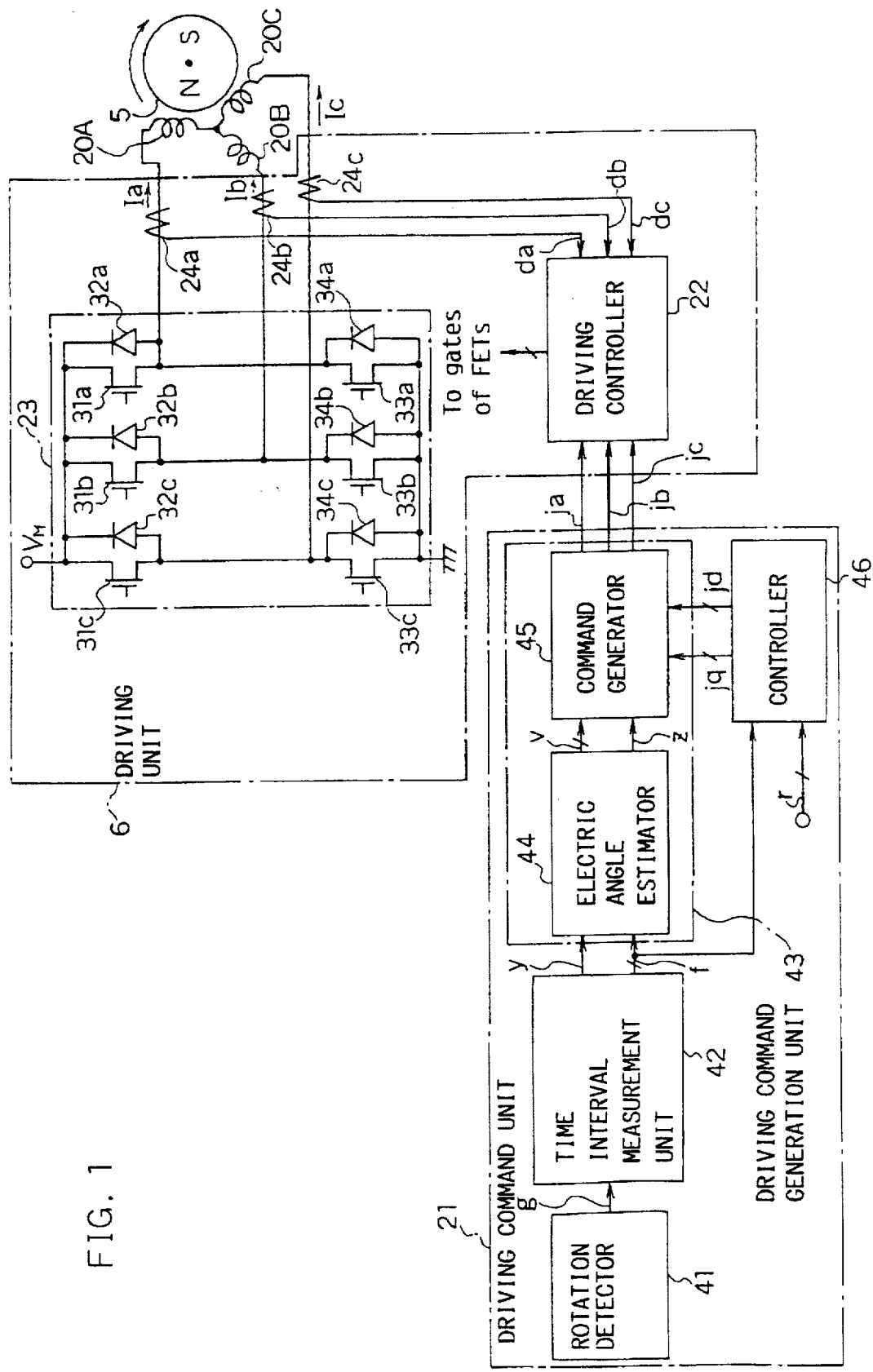
FIG. 1 is a circuit diagram of a first embodiment of the invention.
Figure 2:
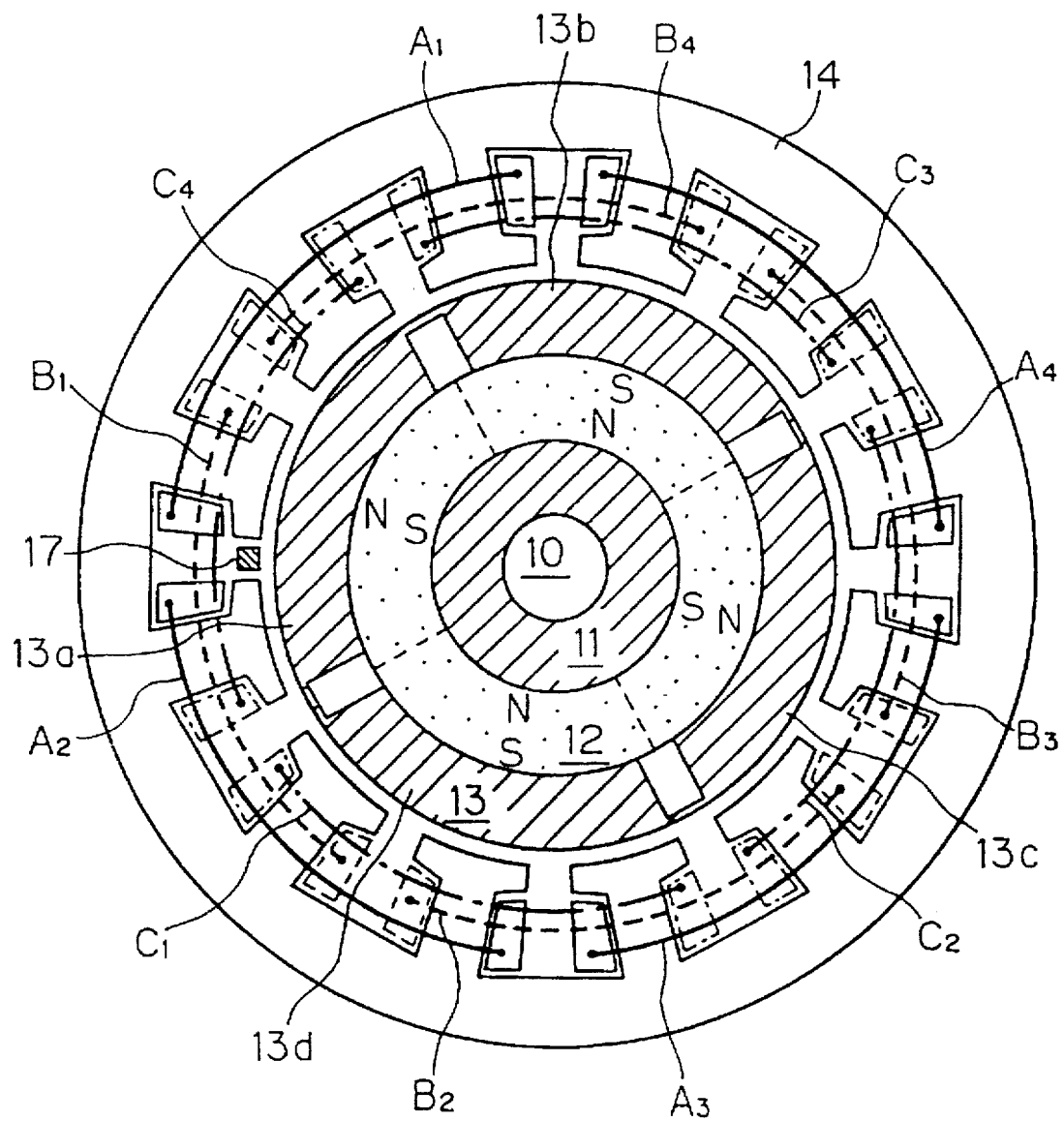
FIG. 2 is a diagram of the motor of the first embodiment.

FIGS. 1 to 7 show a brushless motor of a first embodiment of the invention. FIG. 2 shows the structure of the motor of the first embodiment. A rotor permanent magnet 12 which produces magnetic fluxes of four field poles is fixed together with an inner yoke 11 which is made of a ferromagnetic material and constitutes inner magnetic paths to the rotating shaft 10 of the rotor. The permanent magnet 12 has four magnetic poles (N, S, N, and S) which are arranged at equal angular intervals (90 degree) or at substantially equal angular intervals. An outer yoke 13 which is made of a ferromagnetic material, e.g. soft iron, is fixed to the outer peripheral face of the permanent magnet. The outer yoke 13 comprises yoke blocks 13a, 13b, 13c, and 13d which constitute outer magnetic paths at positions for covering the pole face of the permanent magnet 12. The portions which mechanically connect the four yoke blocks to each other are very thin in the radial direction so that magnetic saturation occurs in the portions. Thereby, the yoke blocks are magnetically separated from each other. In other words, fluxes which directly pass through the connecting portions of the yoke blocks are so small in magnitude that they are negligible. The rotating shaft 10, the inner yoke 11, the permanent magnet 12, and the outer yoke 13 are integrated so as to form the rotor, thereby configuring a field unit in which four field poles are formed by using fluxes generated by the permanent magnet 12 of the rotor.

In a stator core 14, twelve salient poles are arranged at equal angular intervals (30 degree in this embodiment) or at substantially equal angular intervals. And driving windings A1, A2, A3, A4, B1, B2, B3, B4, C1, C2, C3, and C4 are wound on the stator core 14 in the manner that each winding or coil is wound on three salient poles and the windings are shifted in phase from each other. The driving windings A1, A2, A3, and A4 are connected in series in the manner that the current directions in the windings are alternately inverted, thereby forming a first-phase driving winding 20A. Similarly, the driving windings B1, B2, B3, and B4 are connected in series in such a manner that the current directions in the windings are alternately inverted, thereby forming a second-phase driving winding 20B, and the driving windings C1, C2, C3, and C4 are connected in series in the manner that the current directions in the windings are alternately inverted, thereby forming a third-phase driving winding 20C.

The fluxes generated by the permanent magnet 12 of the field unit pass through the yoke blocks 13a, 13b, 13c, and 13d to enter the salient poles or salient teeth of the stator core 14 so as to link the driving windings. With respect to the linkage fluxes due to the permanent magnet 12, there exist phase differences of an electric angle of 120 degree among the first-, second- and third-phase driving windings. In the embodiment, a mechanical angle of 180 degree (a mechanical angle for two poles) corresponds to an electric angle of 360 degree.

A single detection device 17 is disposed at a part of the stator core 14. The detection device detects the fluxes generated by the permanent magnet 12 attached to the rotor and generates an electric signal corresponding to the magnitude of the detected fluxes. As the detection device 17, useful are a Hall element, a magnetoresistive element which is magnetically biased, a saturable reactor, etc.

FIG. 1 shows the circuit configuration of the brushless motor of the first embodiment. In FIG. 1, numeral 5 designates the rotor, numerals 20A, 20B, and 20C respectively designate the three-phase driving windings. Output signals of the driving command unit 21 are given to a driving controller 22. And output signals of the driving controller 22 are given to a power supply unit 23 as control signals. In this invention, an arrow mark with inclined short bar crossing thereon indicates plural output ports or plural output lines in comprehensive manner. Three current detectors 24a, 24b, and 24c are coupled to three output lines of the power supply unit 23, respectively, so as to give detection outputs to the driving controller 22. The power supply unit 23 comprises upper driving transistors 31a, 31b, and 31c, upper diodes 32a, 32b, and 32c, lower driving transistors 33a, 33b, and 33c, and lower diodes 34a, 34b, and 34c. In the embodiment, the driving transistors 31a, 31b, 31c, 33a, 33b, and 33c are MOS FETs. The driving command unit 21 comprises a rotation detector 41, a time interval measurement unit 42, and a driving command generation unit 43 (an electric angle estimator 44 and a command generator 45), and further comprises a controller 46 as required.

Figure 3:
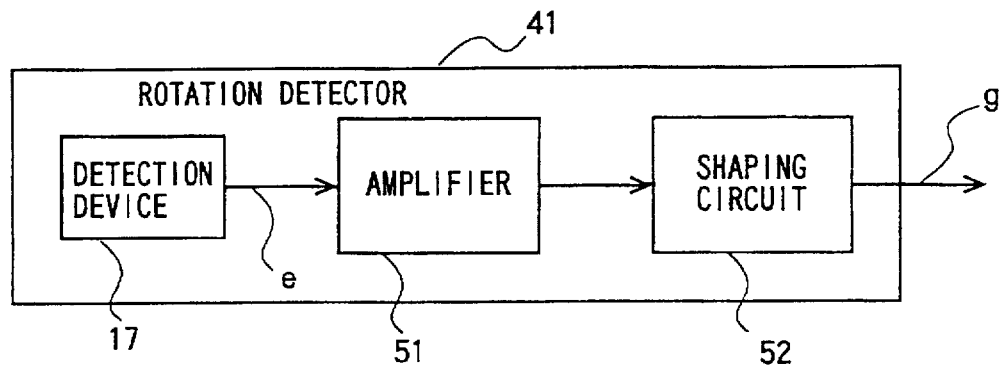
FIG. 3 is a circuit diagram of a rotation detector 41 of the first embodiment.

The rotation detector 41 of the driving command unit 21 generates from an output signal of the detection device 17 a pulse signal g of a frequency which is proportional to the rotational speed of the rotor. FIG. 3 shows an example of the configuration of the rotation detector 41. The output signal e of the detection device 17 is amplified by a low-pass or band-pass amplifier 51 and then waveform-shaped into the pulse signal g by a shaping circuit 52. Since the detection device 17 detects the fluxes of the permanent magnet 12 attached to the rotor, the pulse signal g is generated in synchronization with rotation of the rotor so that one pulse is generated as a result of the rotation corresponding to two poles. In other words, one pulse is generated as a result of the rotation of an electric angle of 360 degree The timing when the pulse is changed corresponds to that when the detection device 17 opposes one of switching positions where the poles of the permanent magnet 12 are switched over.

Figure 4:
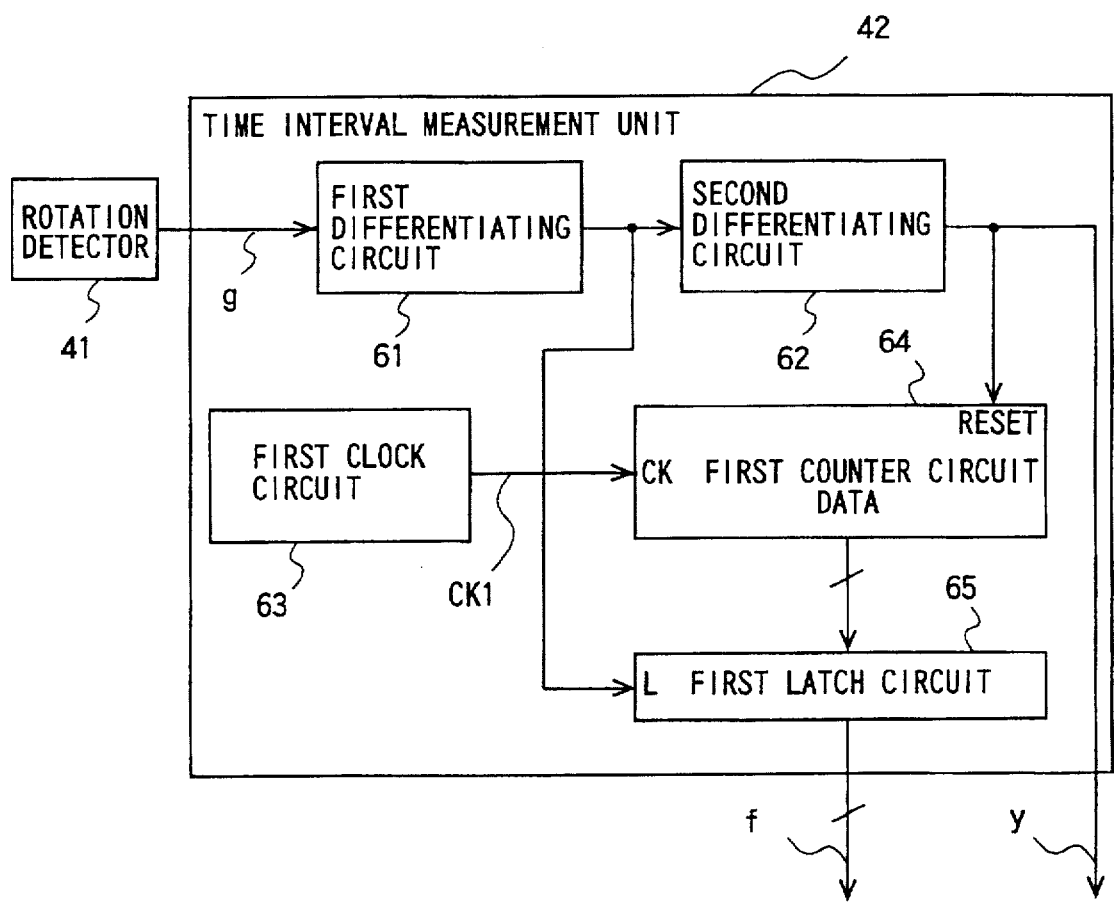
FIG. 4 is a circuit diagram of a time interval measurement unit 42 of the first embodiment.

The time interval measurement unit 42 receives the output pulse signal g of the rotation detector 41 and measures the intervals of adjacent falling edges of the pulse signal g. FIG. 4 shows an example of the configuration of the time interval measurement unit 42. As shown in FIG. 3, the rotation detector 41 comprises the detection device 17, an amplifier 51 for amplifying the output signal of the detection device 17, and a shaping circuit 52 for shaping waveform of the amplifier output signal. By using a falling edge of the pulse signal g as a trigger, a first differentiating circuit 61 generates a first differential pulse which is "H" (high potential state) during a predetermined interval, and, with using a falling edge of the first differential pulse as a trigger, a second differentiating circuit 62 generates a second differential pulse y which is "H" during a predetermined interval. A first counter circuit 64 is reset by the generation of the second differential pulse y, and counts up the clock pulse ck1 of a first clock circuit 63. The count value of the first counter circuit 64 is latched by a first latch circuit 65 at the timing of the generation of the first differential pulse of the first differentiating circuit 61. The latched value is output as an output signal f of the time interval measurement unit 42. Consequently, the output signal f of the first latch circuit 65 is a time measurement result corresponding to the timing interval of the pulse signal g.

The driving command generation unit 43 which consists of the electric angle estimator 44 and the command generator 45 receives the measurement result signal f of the time interval measurement unit 42, estimates the electric angle corresponding to the rotational position of the rotor, and outputs three-phase sinusoidal driving command signals ja, jb, and jc by using the electric angle. The amplitudes of the driving command signals ja, jb, and jc are changed in accordance with current command signals jq and jd of the controller 46.

FIG. 5 shows an example of the configuration of the electric angle estimator 44. A multiplying circuit 71 in FIG. 5 multiplies the measurement result signal f of the time interval measurement unit 42 by a correction signal n (which is substantially equal to 1) of a correction coefficient circuit 78 which will be described later. A second latch circuit 72 latches a multiplied signal from the multiplying circuit 71 in response to the generation of the second differential pulse y. A second counter circuit 74 counts down the clocks pulse ck2 of a second clock circuit 73. At the timing when the count value reaches zero, the second counter circuit outputs an internal timing signal (zero detection pulse) z of a predetermined pulse width. At the timing when the next clock pulse ck2 reaches, the latched value of the second latch circuit 72 is loaded into the second counter circuit 74, and the count-down operation is then continued. Each time the count value reaches zero, the second counter circuit 74 repeats the above-mentioned operation so that the internal timing signal (zero detection pulse) z is output at time intervals corresponding to the latched value of the second latch circuit 72. The frequency of the clock pulse ck2 of the second clock circuit 73 is higher than that of the clock pulse ck1 of the first clock circuit 63 by a predetermined factor. In the embodiment, for the sake of convenience of description, the frequency of the clock pulse ck2 is 12 times of that of the clock pulse ck1, i.e., frequency ratio of [ck2/ck1] is 12 (a higher ratio is better, and the ratio of 36 or higher is actually preferable). As a result, the second counter circuit 74 outputs the internal timing signal z at time intervals which are about $\frac{1}{12}$ times the intervals of the detection timing (the intervals of the edge of the pulse signal g) of the time interval measurement unit 42. A third counter circuit 75 counts up the clock pulse of the internal timing signal z. When the count value v of the third counter circuit 75 reaches a second preset value v2 as shown in FIG. 8(e), a second-preset value detection circuit 77 is activated so that a first-preset value v1 of a first preset value output circuit 76 is loaded into the third counter circuit 75 at the timing of the next pulse of the internal timing signal z. Thereafter, the count-up operation continues sequentially in response to the generation of the internal timing signal z. As a result, count value v of the third counter circuit 75 is in the range between the first and second preset values v1 and v2. The count value v represents the electric angle. In the embodiment, for the sake of convenience of description, the values are set in terms of an electric angle so that v1=−180 degree, and v2=180 degree−(one step)=150 degree.

The correction coefficient circuit 78 obtains the correction signal n from the count value v of the third counter circuit 75. The correction signal n is used only at the timing when the second differential pulse y is generated for activating the second latch circuit 72. The correction signal n will be described. The correction coefficient circuit 78 sets the correction signal n in the following manner. When the count value (converted into an electric angle) v of the third counter circuit 75 is equal to zero, the correction signal n is set to be 1. When the count value v is negative, the correction signal n is set to be (1+k) where k is a negative correction value according to the ratio with respect to an electric angle of 360 degree. When the count value v is positive, the correction signal n is set to be (1+k) where k is a positive correction value according to the ratio with respect to an electric angle of 360 degree. When a deviation v3 from a predetermined value (zero) of the count value v (electric angle) at the timing of the generation of the second differential pulse y is detected, therefore, the correction signal n corresponding to the deviation v3 is obtained. The measurement output signal f of the time interval measurement unit 42 is subjected to multiplication correction and then stored in the second latch circuit 72. The latched value of the second latch circuit 72 will function as data for determining the cycle time intervals (the time intervals of generating the internal timing signal z) of the second counter circuit 74. Therefore, the time intervals of generating the internal timing signal z are corrected by the correction signal n of the correction coefficient circuit 78.

Figure 8:
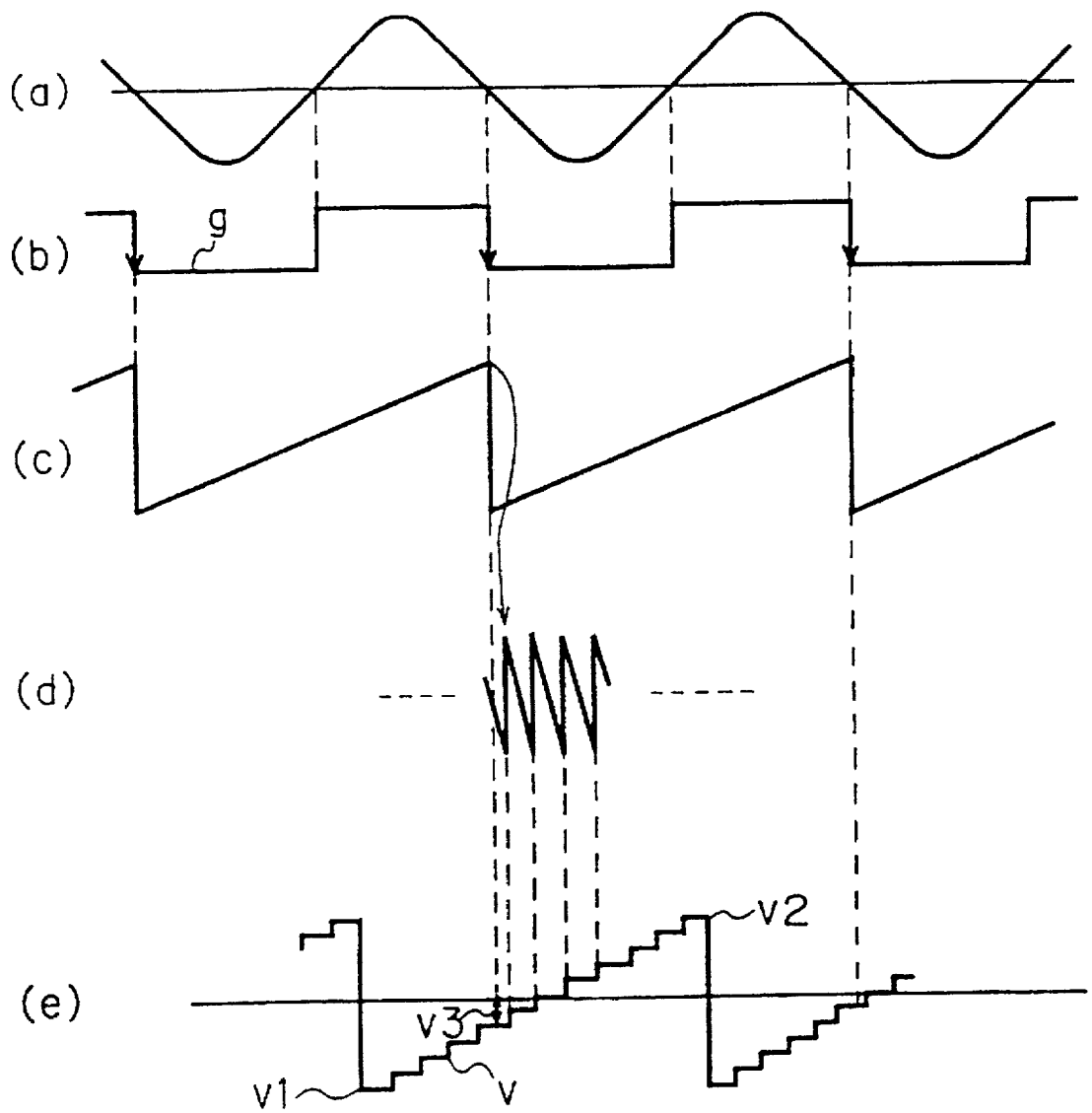
FIG. 8 is a waveform chart illustrating the operation of the first embodiment.

FIG. 8 is a signal waveform chart illustrating the operational relationships between the main portions of the rotation detector 41, the time interval measurement unit 42, and the electric angle estimator 44 (in the figure, the waveforms are shown in the form of analog waveforms). In each waveform of FIG. 8, abscissa is graduated with time, and ordinate with signal amount. A flux detection signal ((a) of FIG. 8) of the rotor permanent magnet 12 which is output from the detection device 17 is waveform-shaped by the rotation detector 41, and then output as the pulse signal g ((b) of FIG. 8). The first counter circuit 64 of the time interval measurement unit 42 digitally measures the timing intervals of falling edges of the pulse signal g ((c) of FIG. 8), and the output signal f of the first latch circuit 65 is obtained as the measurement result. The second counter circuit 74 of the electric angle estimator 44 periodically counts down from the latched value of the second latch circuit 72 in accordance with the output signal f of the time interval measurement unit 42 ((d) of FIG. 8), so that, each time the count value reaches zero, the internal timing signal (zero detection pulse) z is generated. Each time the internal timing signal z is generated, the count value ((e) of FIG. 8) of the third counter circuit 75 corresponding to the estimated electric angle is changed and then output as the electric angle signal v. The deviation v3 between a predetermined value (zero in this embodiment)

and the value of the estimated electric angle at the timing of a falling edge of the pulse signal g is detected. The measurement result signal f of the time interval measurement unit 42 is multiplied by the correction signal n corresponding to the deviation v3, and the multiplication result is latched by the second latch circuit 72. As a result, the time intervals of the internal timing signal z generated by the second counter circuit 74 are corrected in accordance with the deviation v3. Specifically, when the estimated electric angle lags (v3<0), the time intervals of the internal timing signal z are corrected so as to become shorter, and, when the estimated electric angle leads (V3>0), the time intervals of the internal timing signal z are corrected so as to become longer. As a result, the deviation at the timing of the next falling edge of the pulse signal g becomes smaller or zero. Consequently, it is possible to obtain the count signal v (corresponding to the estimated electric angle) of the third counter circuit 75 which is synchronized with the pulse signal g indicative of the rotational position of the rotor.

[Calculation Process in the Command Generator 45]

Figure 6:
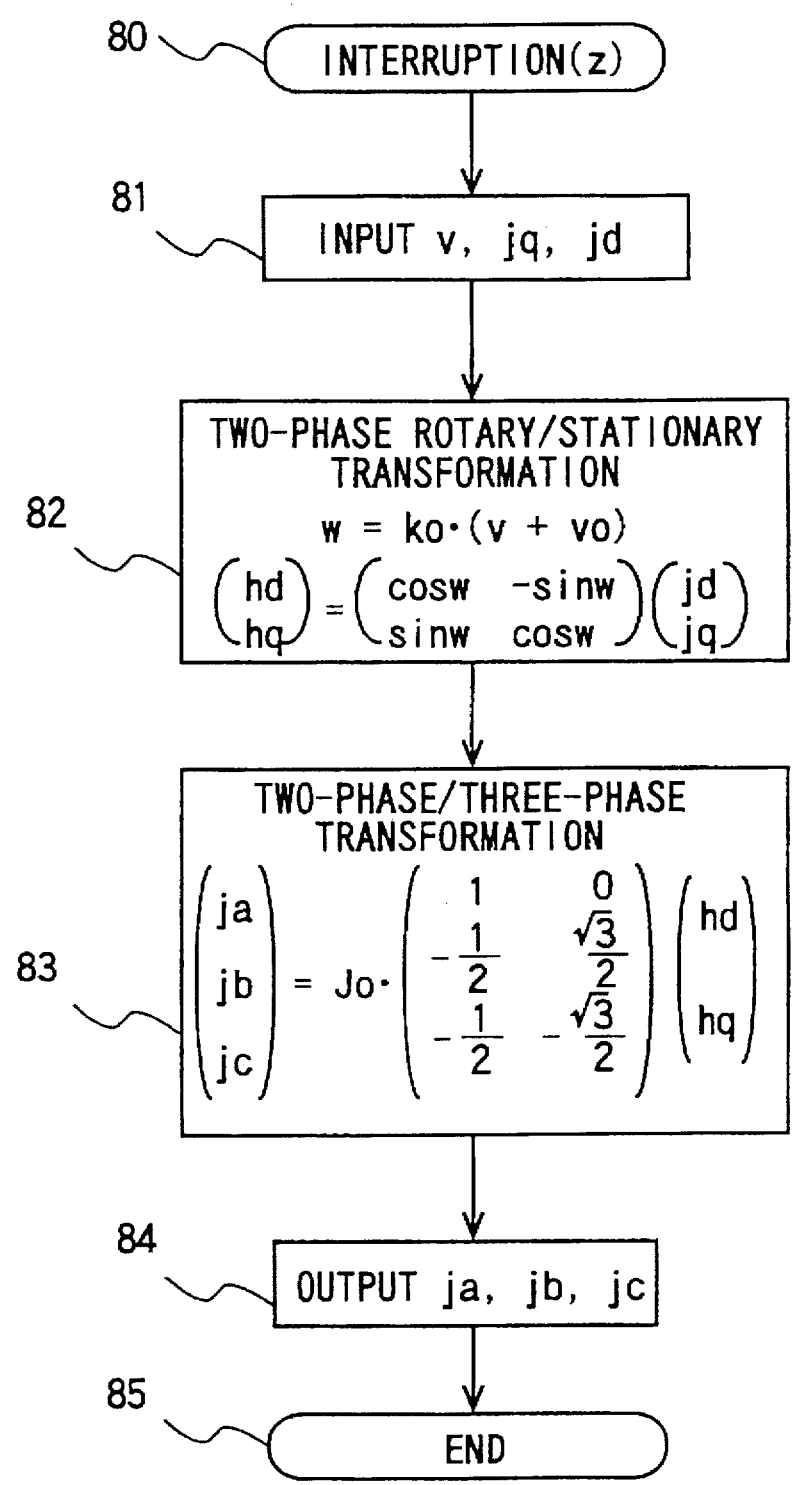
FIG. 6 is a flowchart of a command generator 45 of the first embodiment.

The command generator 45 receives the count signal v, the internal timing signal z, and the current command signals jq and jd, and outputs the three-phase sinusoidal driving command signals ja, jb, and jc. The command generator 45 is configured by a microcomputer and operates the calculation process which is shown in the flowchart of FIG. 6.

(1) Interruption start process 80:

In response to the generation of the internal timing signal z, the following interruption process is operated.

(2) Input process 81:

The count signal v and the current command signals jq and jd (two-phase current command signals) are input.

(3) Two-phase rotary/stationary transformation process 82:

An electric angle w (in degree) for transformation is calculated from the count signal v, which has undergone the phase matching.

$$w = k0 \cdot (v + v0),$$

where k0 is a proportional coefficient and v0 is an amount of the phase shift. The two-phase current command signals jq and jd are transformed by the coordinate transformation between the rotational coordinate and the stationary coordinate with the electric angle w, thereby to produce transformed current command signals hq and hd, shown in the below-mentioned equation (1):

$$\begin{pmatrix} hd \\ hq \end{pmatrix} = \begin{pmatrix} \cos w & -\sin w \\ \sin w & \cos w \end{pmatrix} \begin{pmatrix} jd \\ jq \end{pmatrix}. \quad (1)$$

The transformed current command signals hq and hd are two-phase signals which are different in phase from each other by an electric angle of 90 degree.

(4) Two-phase/three-phase transformation process 83:

The three-phase driving command signals ja, jb, and jc are obtained from the two-phase transformed current command signals jq and jd in accordance with the following equation (2):

$$\begin{pmatrix} ja \\ jb \\ jc \end{pmatrix} = Jo \begin{pmatrix} 1 & 0 \\ -1/2 & \sqrt{3}/2 \\ -1/2 & -\sqrt{3}/2 \end{pmatrix} \begin{pmatrix} hd \\ hq \end{pmatrix}, \quad (2)$$

where Jo is a proportional constant. The driving command signals ja, jb, and jc obtained as a result of the two-phase/three-phase transformation process are three-phase signals which are different in phase from each other by an electric angle of 120 degree.

(5) Output process 84:

The driving command signals ja, jb, and jc are D/A-converted and then output.

(6) Termination process 85:

The interruption process is terminated.

The controller 46 supplies the two-phase current command signals jq and jd to the command generator 45. In the embodiment, a speed command signal r is compared with the measurement result signal f of the time interval measurement unit 42 and a predetermined speed control calculation is performed so as to make the difference between the signals zero, thereby obtaining the current command signals jq and jd. As shown in the flowchart of FIG. 6, the amplitudes of the driving command signals ja, jb, and jc of the command generator 45 are changed in proportion to the current command signals jq and jd.

The driving controller 22 compares the driving command signals ja, jb, and jc with current feedback signals da, db, and dc and conducts the PWM control (Pulse-Width Modulation control) on the driving transistors so that driving currents Ia, Ib, and Ic corresponding to the driving command signals are supplied to the driving windings 20A, 20B, and 20C, respectively.

Figure 7:
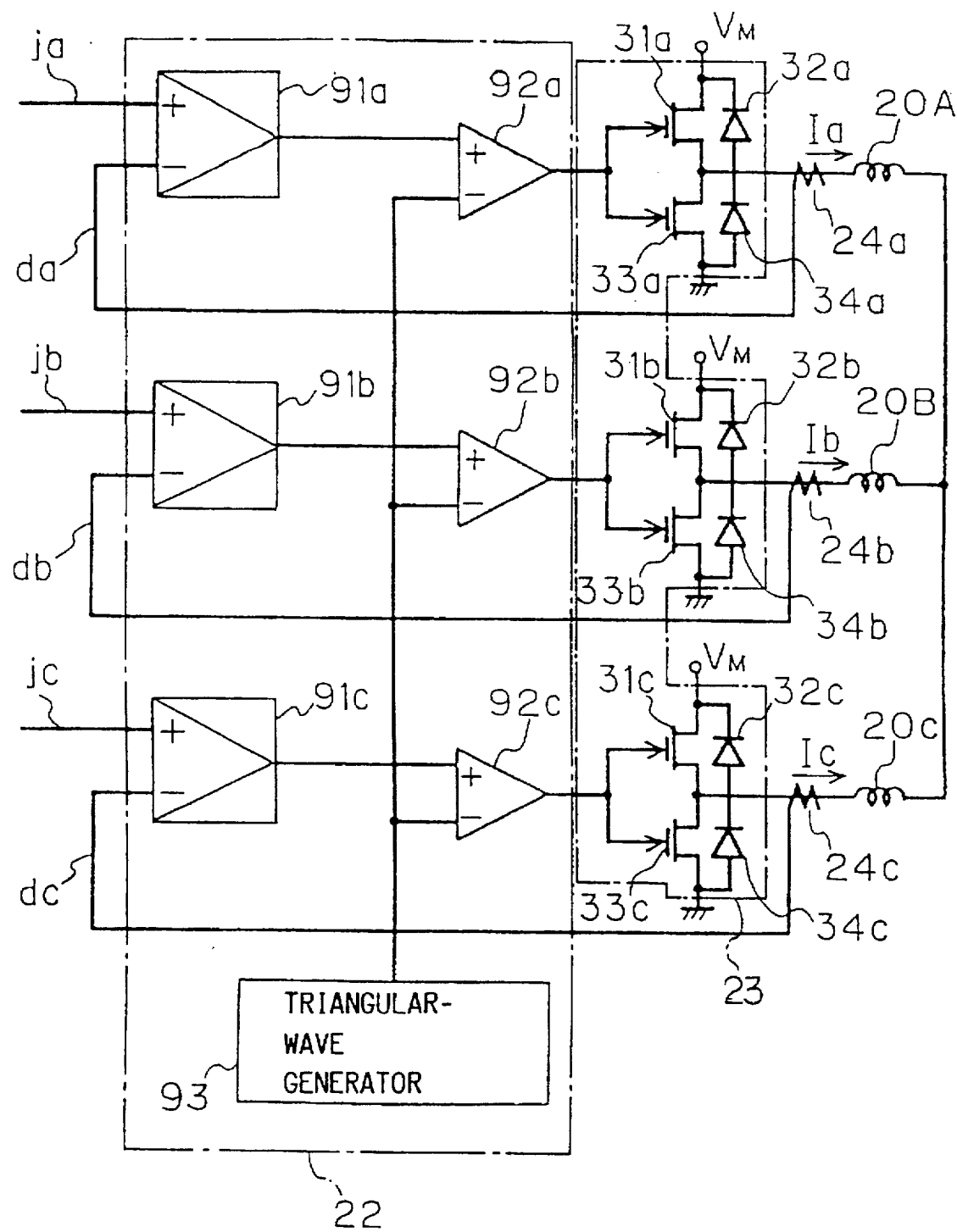
FIG. 7 is a circuit diagram of a driving controller 22 and a power supply unit 23 of the first embodiment.

FIG. 7 shows the configuration of the driving controller 22, and the connection among the power supply unit 23 and the driving windings 20A, 20B, and 20C. The driving controller 22 consists of differential amplifiers 91a, 91b, and 91c, comparators 92a, 92b, and 92c, and a triangular-wave generator 93. The differential amplifier 91a amplifies the difference signal between the driving command signal ja and the current feedback signal da of the current detector 24a, and outputs the amplified signal. The comparator 92a compares the output of the differential amplifier 91a with a triangular-wave signal of the triangular-wave generator 93 which has a predetermined frequency (about 20 kHz), and generates a PWM signal (Pulse-Width Modulation signal). The PWM signal of the comparator 92a controls the ON/OFF operations of the upper and lower driving transistors 31a and 33a so that the driving current Ia which is smoothed by the upper and lower diodes 32a and 34a and the driving winding is supplied to the driving winding 20A. Therefore, a feedback loop is configured by the current detector 24a, the differential amplifier 91a, the comparator 92a, the driving transistors 31a and 33a, the diodes 32a and 34a, and the driving winding, and the driving current Ia becomes a sinusoidal current which is proportional to or substantially proportional to the driving command signal ja.

Similarly, a feedback loop is configured by the current detector 24b, the differential amplifier 91b, the comparator 92b, the driving transistors 31b and 33b, the diodes 32b and 34b, and the driving winding, and the driving current Ib becomes a sinusoidal current which is proportional to or substantially proportional to the driving command signal jb.

Furthermore, a feedback loop is configured by the current detector 24c, the differential amplifier 91c, the comparator 92c, the driving transistors 31c and 33c, the diodes 32c and 34c, and the driving winding, and the driving current Ic becomes a sinusoidal current which is proportional to or substantially proportional to the driving command signal jc.

As shown in the embodiment, when an estimated electric angle is estimated by the rotation detector, the time interval measurement unit, the electric angle estimator, and the command generator, the three-phase sinusoidal driving command signals ja, jb, and jc corresponding to the estimated electric angle are generated. The three-phase sinusoidal driving currents Ia, Ib, and Ic which are proportional to the driving command signals ja, jb, and jc are produced and supplied to the driving windings 20A, 20B, and 20C. Then, it is possible to obtain a driving torque which is less varied or is uniform. This will be described more in detail hereinafter.

The torque is generated by interaction among the driving currents Ia, Ib, and Ic in each phase, and the fluxes of the permanent magnet 12, and usually also the flux magnitude of the permanent magnet 12 is sinusoidally changed. Therefore, the generated torque Tor is given as follows:

$$\begin{aligned} Tor &= Kr \cdot \{\sin w \cdot \sin(w+w1) + \sin(w-120°) \cdot \sin(w+w1-120°) + \sin(w-240°) \cdot \sin(w+w1-240°)\} \\ &= (3/2) \cdot Kr \cdot \cos w1, \end{aligned}$$

where w1 corresponds to the phase displacement (in degree) between the current and the flux density.

As a result, a uniform driving torque Tor can be obtained. Consequently, vibration and noises of the motor are reduced to a very low level.

As shown in the embodiment, when the timing intervals of adjacent falling edges of the pulse signal generated in synchronization with rotation of the rotor are measured, the estimated electric angle is estimated at time intervals from the measurement result. And the sinusoidal driving command signal is generated with the estimated electric angle. Thereby, a very simple single detection device is enough to obtain a sinusoidal driving command signal which is smoothly changed in synchronization with rotation of the rotor.

Furthermore, as shown in the embodiment, when a deviation between the estimated electric angle at the timing of the falling edge of the pulse signal and the predetermined value is detected, and the time intervals of generations of the internal timing signal z are corrected on the basis of the deviation, it is possible to correct the estimated electric angle so as to gradually coincide with a value synchronized with rotation of the rotor. As a result, the driving command signal has a sinusoidal shape which is very well synchronized with rotation of the rotor, thereby preventing the motor from entering step out or loss of synchronism. The estimated electric angle is changed continuously in a range of a predetermined step angle, and there occurs no discontinuity in the sinusoidal driving command signal. Consequently, a smooth driving current can be supplied as described above so that a uniform driving torque is obtained, thereby reducing vibration and noises of the motor.

Furthermore, according to the embodiment, a motor is configured such that fluxes generated by poles of the permanent magnet 12 embedded inside the outer yoke 13 of the rotor field unit are guided by the ferromagentic yoke blocks 13a, 13b, 13c, and 13d so as to enter and leave the salient poles on which the stator driving windings are wound. Thereby, the three-phase sinusoidal driving currents Ia, Ib, and Ic are supplied to the driving windings, and the phases of the driving command signals ja, jb, and jc are caused to appropriately be lead by supplying the current command signals jq and jd changing the ratio of the signals. So that the phases of the driving currents Ia, Ib, and Ic corresponding to the driving command signals are leading, whereby, the torque generated at a high rotational speed and the maximum rotational speed can be increased. This will be described more in detail.

The counter electromotive forces generated by the rotation of the permanent magnet rotor decrease the driving currents, with the result that the driving currents at a high rotational speed are reduced so that the torque is reduced. Also the maximum rotational speed is limited to a low level by the counter electromotive force. By contrast, when a driving current which leads in phase is supplied, the inductance voltage due to the driving current is generated in the direction of reducing the counter electromotive force; so that the marginal voltage for allowing the driving current to flow is increased. As a result, the driving currents at a high rotational speed can be increased and the increased torque and the increased maximum rotational speed can be realized.

In the motor structure of the embodiment, particularly, the inductance as seen from the driving windings is considerably increased by the existence of the outer yoke blocks, and hence the reduction effect due to the inductance voltage is enhanced; so that the effects of the increased torque and the enhanced maximum rotational speed are intensified.

When the driving currents are made lead in phase, also the reluctance torque due to the outer yoke blocks can be used, so that the generated torque is further increased.

These effects constitute a part of advantages which are provided by supplying a sinusoidal driving current. The degree of lead in phase of the driving command signals and the driving current can be changed when required. At a low rotational speed, the degree of lead in phase is set to be small or zero. And, as the rotational speed is made higher, the degree of lead in phase is set to be larger. The lead phase of the driving command signals can be realized also by a configuration in which the phase of the estimated electric angle itself is caused to lead from the electric angle corresponding to the actual rotational position. Also such a configuration is within the scope of the invention.

Starting of the brushless motor of the embodiment is carried out as follows: The three-phase driving command signals which has a predetermined periods are supplied to the driving controller 22 by a starting circuit, which is not shown. So that the driving currents to the driving windings 20A, 20B, and 20C are forcedly switched, thereby causing the rotor to be rotated in a predetermined direction. As the rotation of the rotor advances, the pulse signal g of the rotation detector 41 is generated and the time interval measurement unit 42 is activated so that the steady sinusoidal driving command signals ja, jb, and jc are generated, thereby transferring the operation to the above-mentioned steady driving operation (at this time, the starting circuit is deactivated).

[Embodiment 2]

Hereinafter, a second embodiment of the invention will be described with reference to the accompanying drawings.

Figure 9:
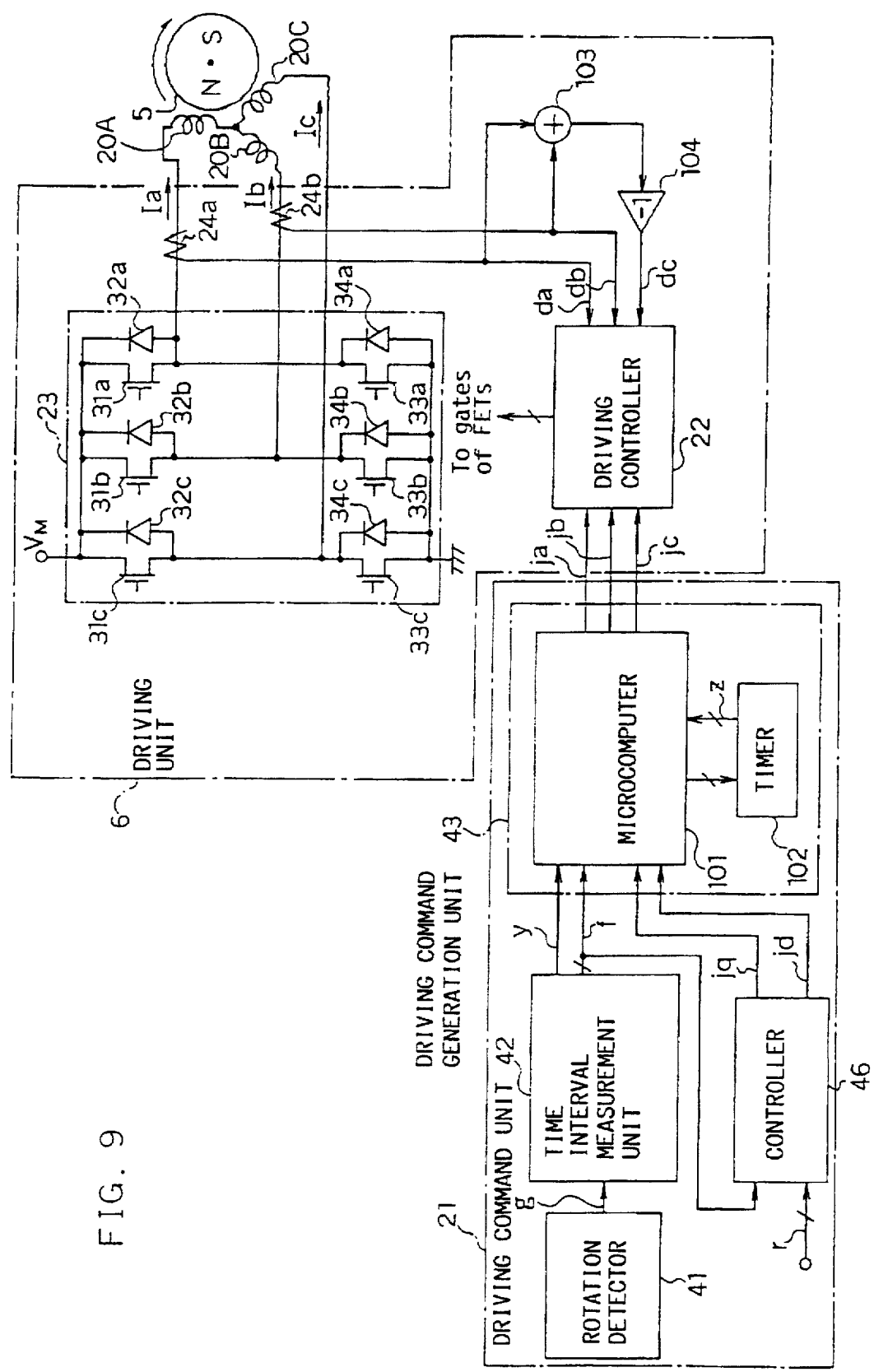
FIG. 9 is a circuit diagram of a second embodiment of the invention.

FIGS. 9 to 12 show a brushless motor of the second embodiment of the invention. FIG. 9 shows the circuit configuration of the second embodiment (the components which are the same as those of the first embodiment are designated by the same reference numerals, and redundant duplicated description thereof are omitted). In the embodiment, the driving command generation unit 43 of the driving command unit 21 is configured by a microcomputer 101 and a timer 102 so that the function is further enhanced as described later. The number of the current detectors is reduced to two, and the current detection for the remaining one phase is conducted by an adder 103 and an inverting amplifier 104. The configurations and operations of the other portions are the same as those of the embodiment described above and hence their description is omitted. The motor of the embodiment has the same structure as that of FIG. 2.

First, current detection will be described. Since the synthesized value of the three-phase driving currents Ia, Ib, and Ic is zero, also that of the current feedback signals da, db, and dc is zero. Consequently, a signal for one phase can be obtained from signals for the other two phases in accordance with the following equation:

$dc=-(da+db)$.

Therefore, by adding the current feedback signals da and db for the two phases are with each other by the adder 103 and by inverting the sign of the addition result by the inverting amplifier 104, it is possible to obtain the current feedback signal dc for the remaining one phase.

Figure 10:
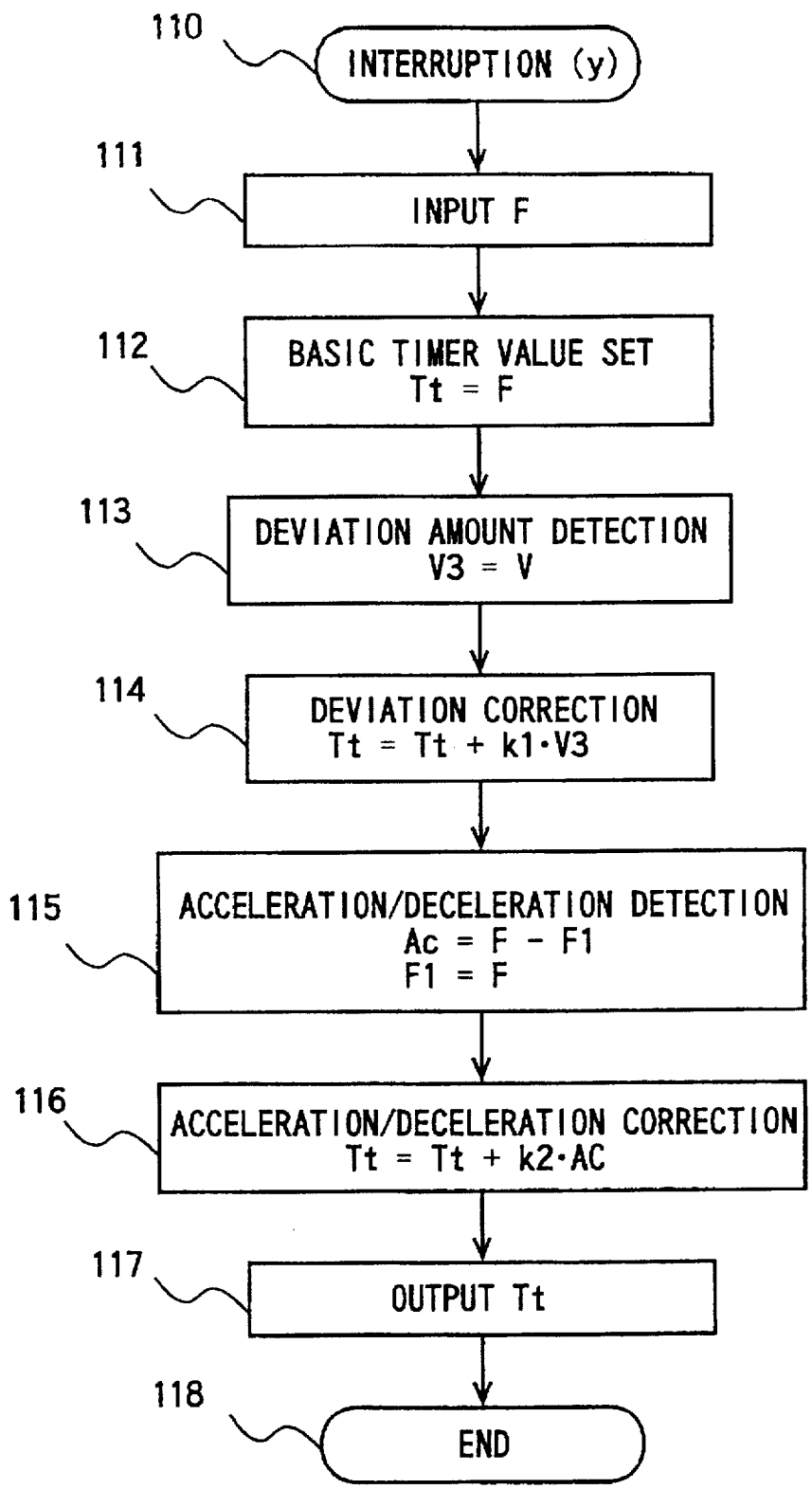
FIG. 10 is a first flowchart of a microcomputer 101 of the second embodiment.
Figure 11:
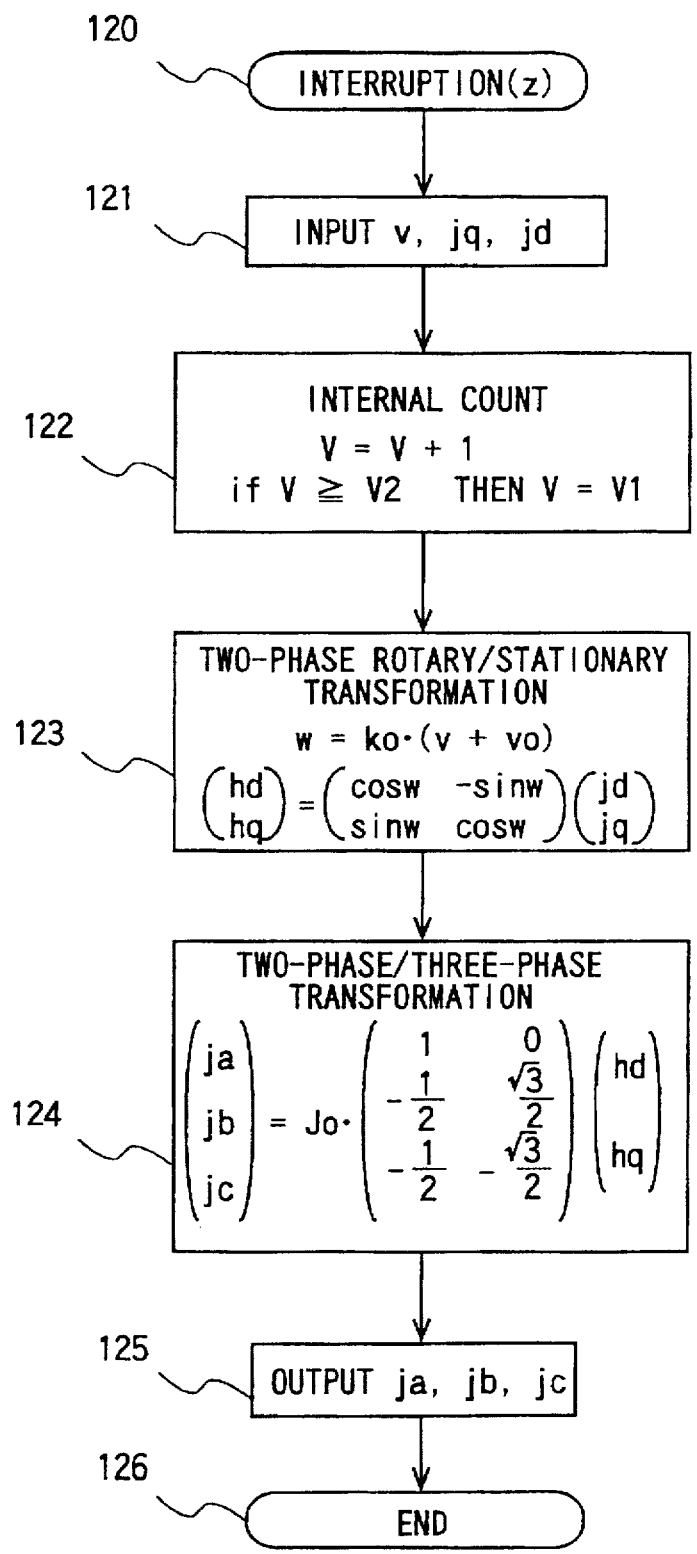
FIG. 11 is a second flowchart of the microcomputer 101 of the second embodiment.

Next, the operations of the microcomputer 101 and the timer 102 of the driving command generation unit 43 will be described. The microcomputer 101 receives the measurement result signal f of the time interval measurement unit 42, the second differential pulse y, and the current command signals jq and jd, conducts a predetermined calculation process, and outputs the driving command signals ja, jb, and jc. FIGS. 10 and 11 show flowcharts of the microcomputer 101.

[Interruption Process of FIG. 10]

First, an interruption process of FIG. 10 using the second differential pulse y will be described. This process is executed each time the time interval measurement unit 42 obtains a new measurement result.

(1) Interruption process 110:

When the second differential pulse y is generated, the following interruption process is conducted.

(2) Input process 111:

The measurement result signal f of the time interval measurement unit 42 is input, and its value is set as F.

(3) Basic timer value set process 112:

The measurement result F is set as the timer value Tt of the timer 102, that is, $Tt=F$.

(4) Deviation amount detection process 113:

The count value V (corresponding to the estimated electric angle) of an internal counter (described later) at this time is entered in V3, that is, $V3=V$, so as to obtain the deviation from a predetermined value (zero) of the value of the internal counter. When the phase of the internal count value lags, V3 is negative, and, when the phase leads, V3 is positive.

(5) Deviation correction process 114:

The timer value Tt is corrected in accordance with the deviation V3, that is, $Tt=Tt+k1\cdot V3$, where k1 is a proportional coefficient. When the phase of the internal count value lags, V3 is negative, namely V3<0, and Tt is corrected so as to become smaller. When the phase of the internal count value leads, V3 is positive, namely V3>0, and Tt is corrected so as to become larger.

(6) Acceleration/deceleration detection process 115:

An acceleration/deceleration value Ac of the acceleration/deceleration state of the rotor is calculated from a new measurement result F and the immediately previous measurement result F1. For the next process, F is then substituted into F1 as follows:

$Ac=F-F1$ $F1=F$.

During acceleration, the relation F<F1 holds, and hence the acceleration/deceleration value Ac is negative. During deceleration, the relation F>F1 holds, and hence the acceleration/deceleration value Ac is positive.

(7) Acceleration/deceleration correction process 116:

In accordance with the acceleration/deceleration value Ac, the timer value Tt is corrected. Specifically, $Tt=Tt+k2\cdot Ac$, where k2 is a proportional coefficient. During acceleration, Ac<0 and Tt is corrected so as to become smaller. During deceleration, Ac>0 and Tt is corrected so as to become larger.

(8) Output process 117 to the timer:

The timer value Tt is output to the timer 102 and held therein. The timer 102 conducts the down-count operation on the timer count with using Tt as the load value. Each time, the timer count reaches zero, the timer outputs the internal timing signal z to the microcomputer 101, and then continues the down-count operation with loading Tt. Consequently, the internal timing signal z can be obtained at internal timing intervals corresponding to the timer value Tt.

(9) Interruption termination process 118:

The interruption process is terminated.

[Interruption Process of FIG. 11]

Next, an interruption process of FIG. 11 using the internal timing signal z will be described. This process is executed each time the timer 102 generates the internal timing signal z.

(1) Interruption process 120:

When the internal timing signal z is generated, the following interruption process is conducted.

(2) Input process 121:

The current command signals jq and jd are input.

(3) Internal count process 122:

The internal count value V corresponding to the estimated electric angle is incremented, that is, $V=V+1$.

When V is equal to (or larger than) a second preset value V2, V is reset to a first preset value V1. The first preset value V1 is a negative value which corresponds to —180 degree in the term of an electric angle, and the second preset value V2 is a positive value which corresponds to {180 degree—(the angle corresponding to one count)}. Therefore, the internal count value V is counted up each time the internal timing signal z reaches, and repeatedly has a value between the first and second preset values V1 and V2.

(4) Two-phase rotational/stationary transformation process 123:

The electric angle w for transformation which has undergone the phase matching is calculated from the internal count value V:

$w=k0\cdot(V+V0)$, where k0 is a proportional coefficient and V0 is an amount of the phase shift. Then, the transformed current command signals hq and hd are produced by the coordinate transformation between the rotational coordinate and the stationary coordinate (the specific equation of the process is shown in the afore-mentioned equation(1)).

(5) Two-phase/three-phase transformation process 124:

The three-phase driving command signals ja, jb, and jc are calculated from the above-mentioned two-phase transformed current command signals hq and hd (the specific equation of the process is shown in the afore-mentioned equation (2)).

(6) Output process 125:

The driving command signals ja, jb, and jc are D/A-converted and then output.

(7) Termination process 127:

The interruption process is terminated.

In the embodiment, the structure of the motor, and the configurations and operations of the rotation detector 41, the time interval measurement unit 42, the controller 46, the driving controller 22, and the power supply unit 23 are the same as those of the first embodiment, and hence their description is omitted. Also in the embodiment, the driving currents Ia, Ib, and Ic are formed as three-phase sinusoidal currents which are proportional to the driving command signals ja, jb, and jc.

In this second embodiment, a deviation of the estimated electric angle at the timing of the generation of an edge of the pulse signal g is detected, and the time intervals of generating the internal timing signal are corrected on the basis of the deviation so that the estimated electric angle is corrected to gradually coincide with a value synchronized with rotation of the rotor. At the same time, the time intervals of generating the internal timing signal are corrected on the basis of the acceleration/deceleration value Ac detected from the acceleration/deceleration state of the rotor of the rotor, in such a manner that, during acceleration, the time intervals are made shorter, and, during deceleration, the time intervals are made longer. According to this configuration, also the estimated electric angle in the acceleration/deceleration state of the rotor coincides very well with the rotational position of the rotor so that a torque which is less varied or is uniform is obtained.

These correction processes may be omitted at any time. When the deviation correction process 114 of FIG. 10 is omitted, for example, only the acceleration/deceleration correction is operated. When the acceleration/deceleration correction process 116 is omitted, only the deviation correction process is operated. When both the deviation correction process 114 and the acceleration/deceleration correction process 116 are omitted, all the correction processes are not operated.

[Direct Correction of Estimated Electric Angle]

Figure 12:
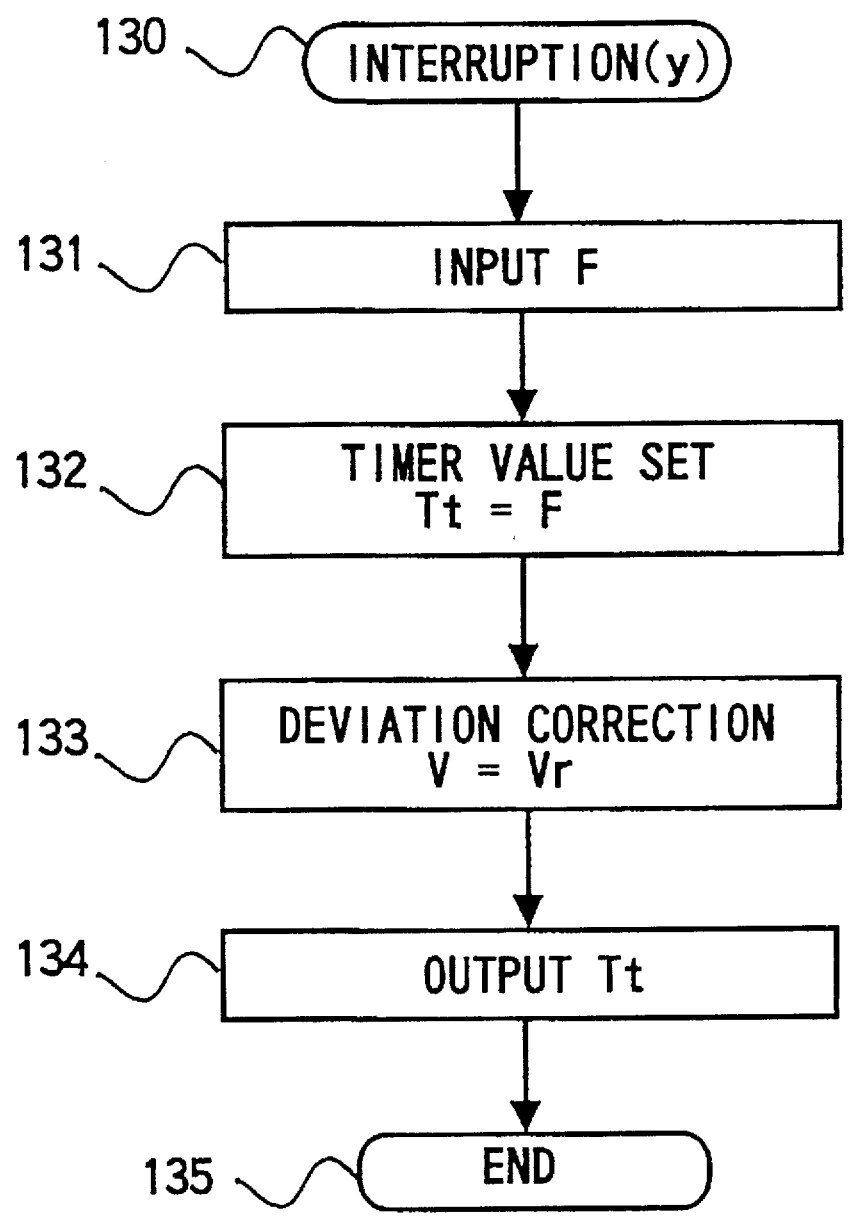
FIG. 12 is a third flowchart of the microcomputer 101 of the second embodiment which is used in place of the first flowchart.

Alternatively, the deviation correction process may be simplified so that the estimated electric angle is directly corrected to a predetermined value at the timing of the generation of the pulse signal g. FIG. 12 shows a specific flowchart of this alternative (this flowchart is to be replaced with that of FIG. 10).

(1) Interruption process 130:

When the second differential pulse y is generated, the following interruption process is conducted.

(2) Input process 131:

The measurement result signal f of the time interval measurement unit 42 is input, and its value is set as F.

(3) Timer value set process 132:

The measurement result F is set as the timer value Tt, that is,

Tt=F.

(4) Deviation amount correction process 133:

The count value V is set to be a predetermined value Vr (for example, zero), that is, V=Vr.

(5) Output process 134 to the timer:

The timer value Tt is output to the timer 102 and held therein. The internal timing signal z is output at internal timing intervals corresponding to the timer value Tt.

(6) Interruption termination process 135:

The interruption process is terminated.

Although this method has a disadvantage that discontinuity of a relatively large degree easily occurs in the estimated electric angle and the driving command signals lack in smoothness; this method has an advantage that the estimated electric angle can be instantly synchronized with rotation of the rotor. Consequently, the method is effective in the case where deviation is small, such as a steady constant-speed rotation state.

When the brushless motor of the embodiment is to be started, the three-phase driving command signals which varies with predetermined periods are supplied to the driving controller 22 by a start process program (not shown) of the microcomputer 101; and the driving currents to the driving windings 20A, 20B, and 20C are forcedly switched, thereby to cause the rotor to be rotated in a predetermined direction. As the rotation of the rotor advances, the pulse signal g of the rotation detector 41 is generated and the time interval measurement unit 42 is activated so that the steady sinusoidal driving command signals ja, jb, and jc are generated, thereby transferring the operation to the above-mentioned steady driving operation (at this time, the start process program is stopped).

In the embodiment, the rotation detector 41 is configured by using the detection device which detects the fluxes of the permanent magnet. But the invention is not limited to this configuration. That is, such a rotation detector may be alternatively used as that detects a signal corresponding to the counter electromotive force (speed electromotive force) generated in a driving winding of one phase. Such a configuration is also within the scope of the invention. When a configuration in which a pulse signal is obtained from the counter electromotive force generated in a driving winding is employed, it is not required to use a special detection device, and hence the structure of the motor is simplified.

In the embodiment, the driving transistors are controlled in accordance with a result of comparison between the three-phase driving command signals ja, jb, and jc and the three-phase current feedback signals da, db, and dc. But the invention is not restricted to this configuration. For example, such a configuration may be employed that: the driving command signals ja and jb for two phases are compared with current feedback signals da and db for the two phases to produce comparison error signals for the two phases, a comparison error signal for the remaining one phase is produced by adding the comparison error signals for two phases to each other and inverting the sign of the addition result, and the driving transistors are controlled by the thus-produced comparison error signals for three phases. Also such a configuration is within the scope of the invention.

In the embodiment, the three-phase driving command signals ja, jb, and jc and the three-phase current feedback signals da, db, and dc in the form of analog signals are compared with each other. But the invention is not restricted to this configuration. For example, a configuration may be employed such that: the current feedback signals da, db, and dc are A/D-converted and then supplied in the form of digital signals to the microcomputer, and the driving command signals and the current feedback signals are compared digitally with each other. Also such a configuration is within the scope of the invention. In the specification, the terms of a sinusoidal driving command signal and a sinusoidal driving current mean that, in the case where the current command signals jq and jd are constant, the driving command signal and the driving current vary substantially sinusoidally in response to change of the estimated electric angle.

[Embodiment 3]

Hereinafter, a third embodiment of the invention will be described with reference to the accompanying drawings.

Figure 13:
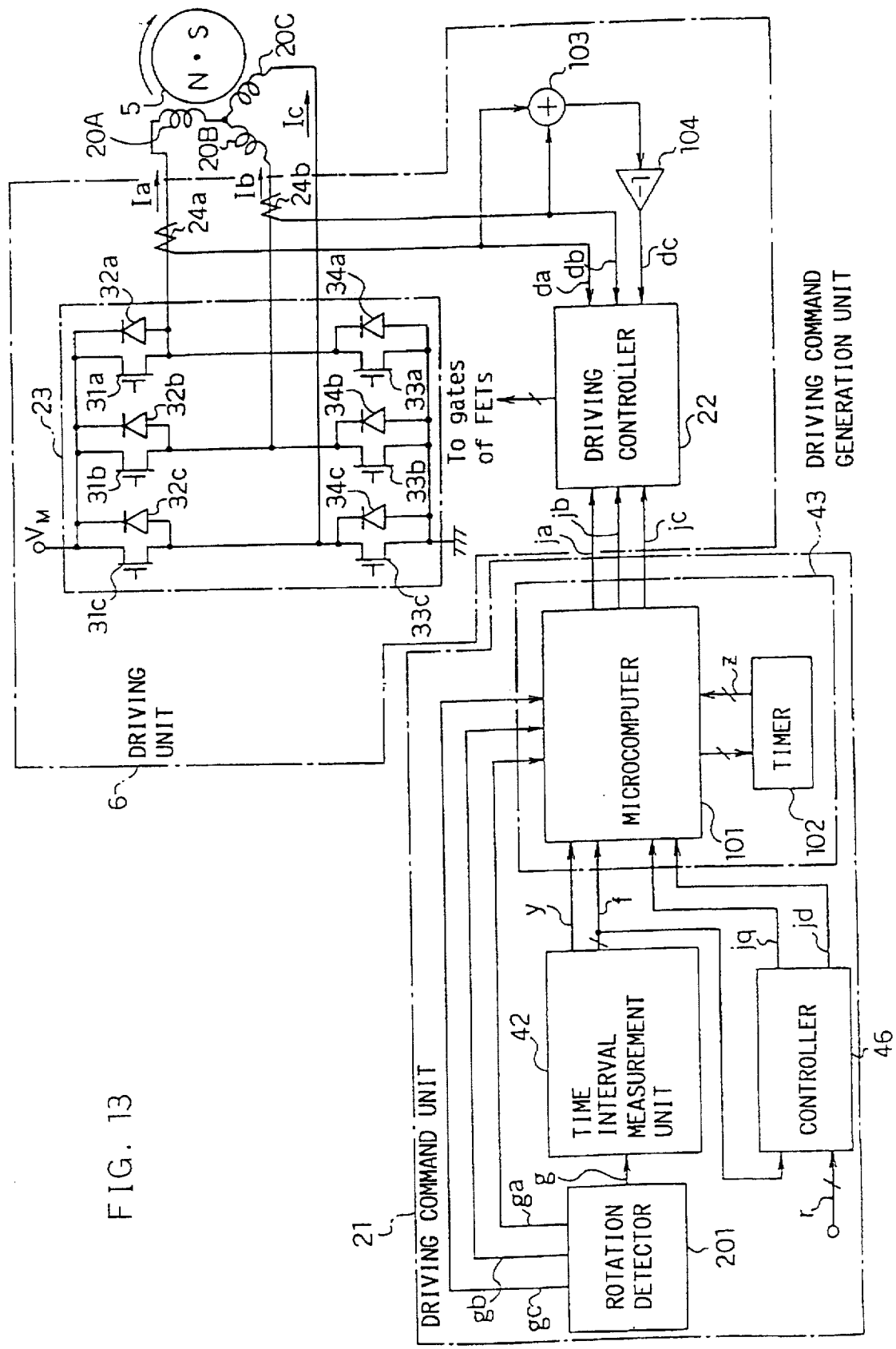
FIG. 13 is a circuit diagram of a third embodiment of the invention.
Figure 14:
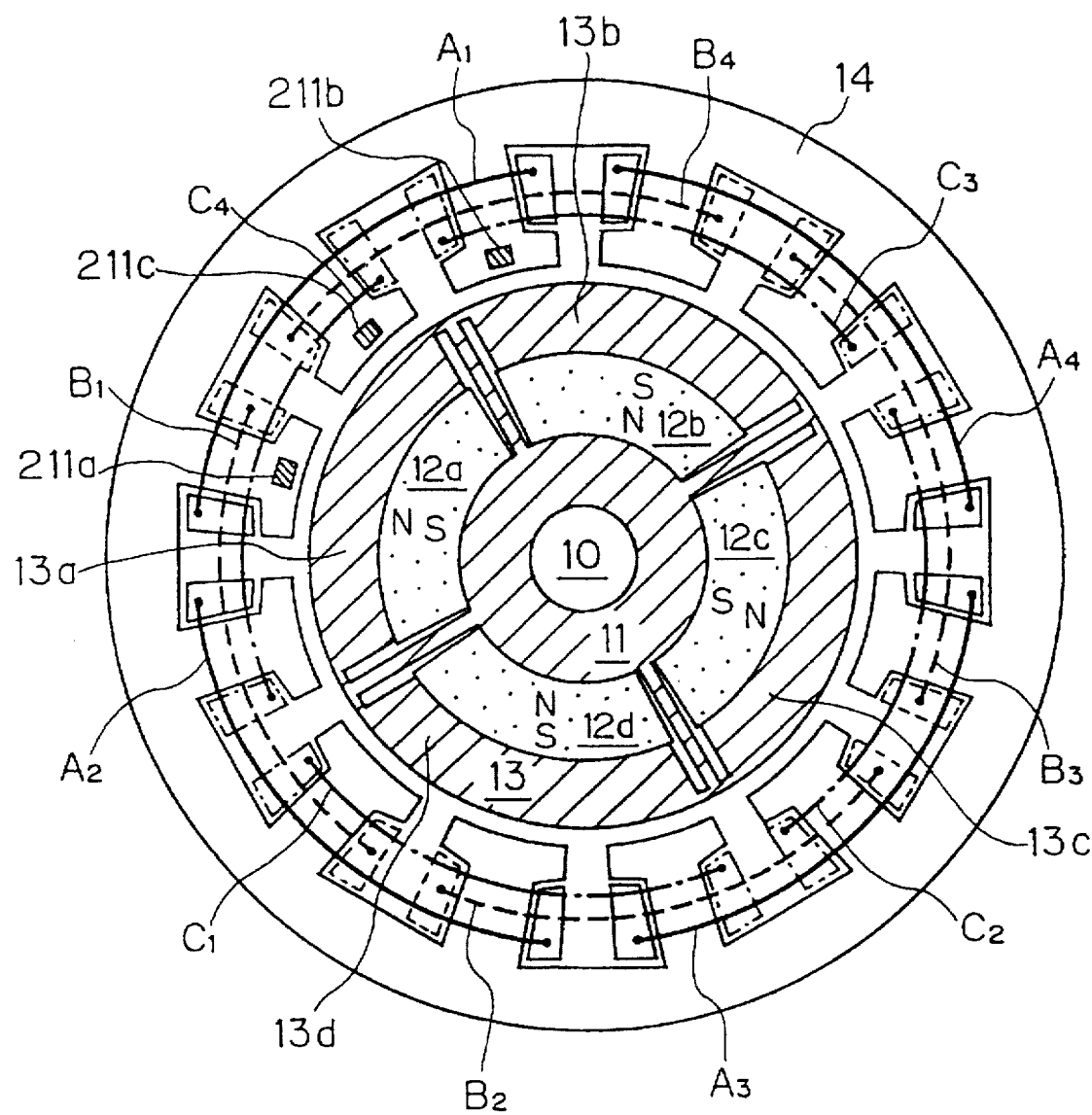
FIG. 14 is a diagram of the motor of the third embodiment.

FIGS. 13 to 17 show a brushless motor of the third embodiment of the invention. FIG. 13 shows the circuit configuration of the third embodiment, and FIG. 14 shows the structure of the motor. In the embodiment, a plurality of detection devices are used and processes of a rotation detector 41 and a microcomputer 101 are improved so that also the starting operation using position detection signals is operated. The components which are similar in configuration and operation to those of the embodiments described above are designated by the same reference numerals.

First, the structure of the motor shown in FIG. 14 will be described. The inner and outer yokes 11 and 13 which are made of a ferromagnetic material and attached to the rotating shaft 10 of the rotor have four thin connecting portions. The inner and outer yokes are mechanically connected to each other by the connecting portions, but magnetically separated from each other because magnetic saturation occurs in the portions. Permanent magnets 12a, 12b, 12c, and 12d which are radially magnetized are embedded into the four gaps between the inner and outer yokes 11 and 13, with alternately changing the direction of the polarities. The yoke blocks 13a, 13b, 13c, and 13d of the outer yoke 13 are arranged on the outer peripheral side of the poles, with the result that the field unit consisting of the permanent magnets 12a, 12b, 12c, and 12d and the outer yoke 13 forms four magnetic poles (N, S, N, and S) which are sequentially arranged at equal angular intervals (90 degree) or at substantially equal angular intervals on the circumference.

The three-phase driving windings (A1, A2, A3, and A4), (B1, B2, B3, and B4), and (C1, C2, C3, and C4) are wound on the stator core 14 with forming a predetermined phase difference. The windings (A1, A2, A3, and A4) constitute the first-phase driving winding 20A, the windings (B1, B2, B3, and B4) constitute the second-phase driving winding 20B, and the windings (C1, C2, C3, and C4) constitute the third-phase driving winding 20C. Detection devices 211a, 211b, and 211c which detect the fluxes produced by the field unit are arranged so as to respectively correspond to the three-phase driving windings 20A, 20B, and 20C.

Figure 15:
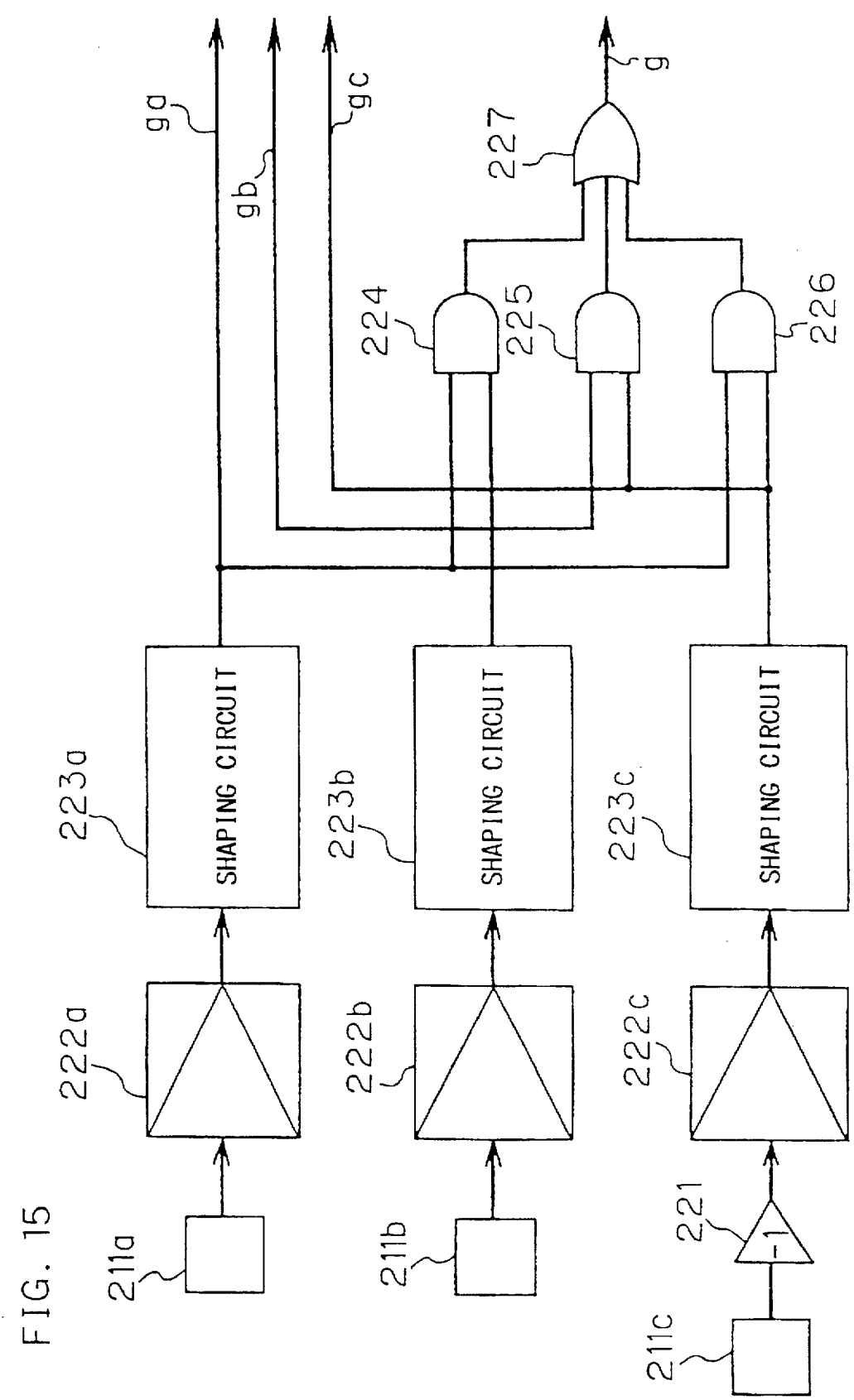
FIG. 15 is a circuit diagram of a rotation detector 201 of the third embodiment.
Figure 18:
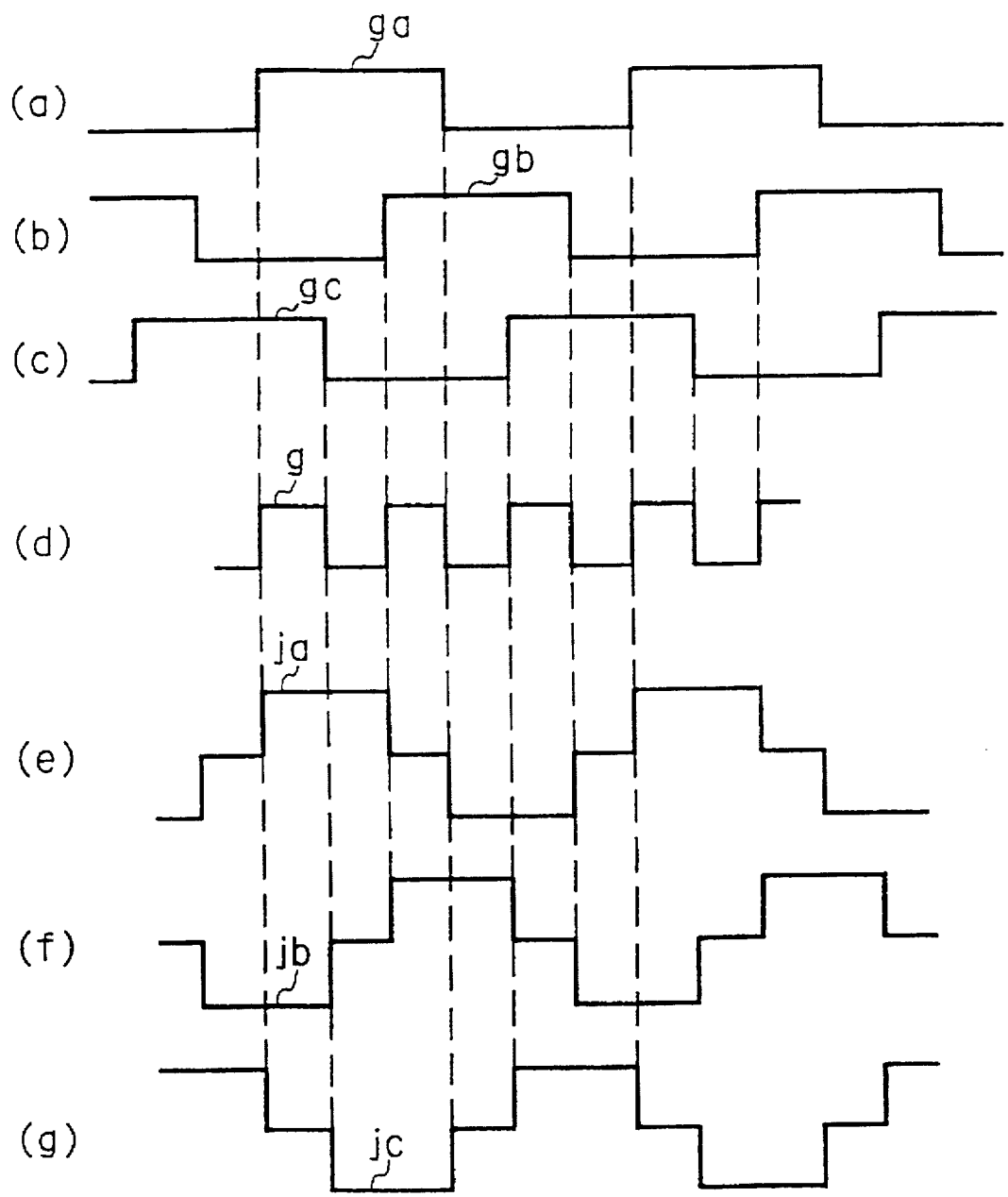
FIG. 18 is a waveform chart illustrating the operation of the third embodiment.

The rotation detector 201 outputs three-phase position signals ga, gb, and gc which are obtained from the detection outputs of the three detection devices 211a, 211b, and 211c and which correspond to the rotational position of the rotor, and a pulse signal g which is obtained by synthesizing the position signals. FIG. 15 specifically shows the configuration of the rotation detector 201. The outputs of the detection devices 211a and 211b are subjected to amplification of a required fold value by amplifiers 222a and 222b and then waveform-shaped into the position signals ga and gb by shaping circuits 223a and 223b. The output of the detection device 211c is subjected to inversion amplification by an inverting amplifier 221 so that the sign is inverted, and the inverted output is subjected to amplification of a required fold value by an amplifier 222c and then waveform-shaped into the position signal gc by a shaping circuit 223c. As a result, the position signals ga, gb, and gc are three-phase digital signals which are different in phase from each other by an electric angle of 120 degree The position signals ga, gb, and gc are logically synthesized by AND circuits 224, 225, and 226 and an OR circuit 227 so that the pulse signal g is output. When two of the position signals are "H" (high potential state), the pulse signal g is "H," and, when two of the position signals are "L" (low potential state), the pulse signal g is "L." The relationships among the waveforms of the position signals ga, gb, and gc and the pulse signal g are shown in (a) to (d) of FIG. 18.

The pulse signal g of the rotation detector 201 is supplied to the time interval measurement unit 42. The generation timing intervals of falling edges of the pulse signal g are measured and the measurement result signal f and the second differential pulse y are obtained. The configuration of the time interval measurement unit 42 is the same as that shown in FIG. 4.

The microcomputer 101 receives the measurement result signal f and the second differential pulse y of the time interval measurement unit 42, the current command signals jq and jd, and the position signals ga, gb, and gc. And the microcomputer 101 operates a predetermined process, and outputs the driving command signals ja, jb, and jc.

Figure 16:
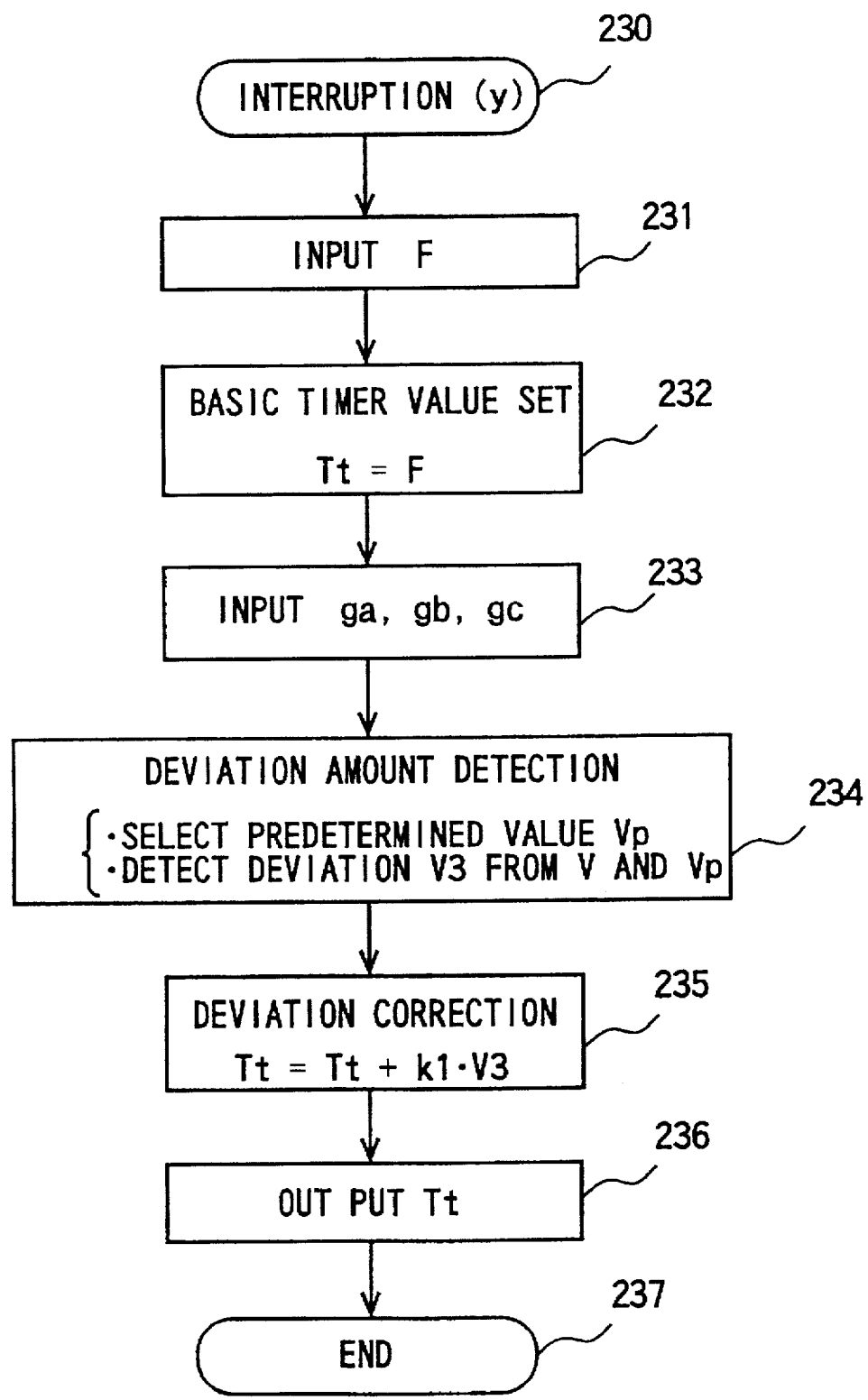
FIG. 16 is a first flowchart of a microcomputer 101 of the third embodiment.

In a steady constant-speed rotation state, the microcomputer 101 executes the processes of a flowchart of FIG. 16 and the above-described flowchart of FIG. 11.
[Interruption Process of FIG. 16 and FIG. 11]

An interruption process of FIG. 16 using the second differential pulse y will be described. This process is executed each time the time interval measurement unit 42 obtains a new measurement result.

(1) Interruption process 230:

When the second differential pulse y is generated, the following interruption process is conducted.

(2) Input process 231:

The measurement result signal f of the time interval measurement unit 42 is input, and its value is set as F.

(3) Basic timer value set process 232:

The measurement result F is set as the timer value Tt, that is,

Tt=F.

(4) Input process 233:

The position signals ga, gb, and gc are input.

(5) Deviation amount detection process 234:

The expected value Vp of the internal count value V (which corresponds to the estimated electric angle and is the count value obtained in the internal count process 122 of the flowchart of FIG. 11) is selected in accordance with the states of the position signals ga, gb, and gc. Since the timing of the generation of a falling edge of the pulse signal g has three states with respect to the states of the position signals ga, gb, and gc, the corresponding expected value is selected from three expected values which are separated from each other by an estimated electric angle of 120 degree Next, the deviation V3 from the selected expected value Vp of the internal count value V at this time is detected (V3=V−Vp). When the phase of the internal count value lags, therefore, V3 is negative, and, when the phase leads, V3 is positive.

(6) Deviation correction process 235:

The timer value Tt is corrected in accordance with the deviation V3, that is,

Tt=Tt+k1·V3, where k1 is a proportional coefficient. When the phase of the internal count value lags, V3 is negative, namely V3<0, and Tt is corrected so as to become smaller. When the phase of the internal count value leads, V3 is positive, namely V3>0, and Tt is corrected so as to become larger.

(7) Output process 236 to the timer:

The timer value Tt is output to the timer 102 and held therein. The timer 102 conducts the down-count operation on the timer count with using Tt as the load value. Each time the timer count reaches zero, the timer outputs the internal timing signal z to the microcomputer 101, and then continues the down-count operation with loading Tt. Consequently, the internal timing signal z can be obtained at internal timing intervals corresponding to the timer value Tt.

(8) Interruption termination process 237:

The interruption process is terminated. In this way, the timer value of the timer 102 for generating the internal timing signal z is set.

The interruption process using the internal timing signal z of the timer 102 is the one shown in the above-described flowchart of FIG. 11. The internal timing signal z is generated at the time intervals according to the timer value Tt, the count value V of the internal counter is updated to obtain a new estimated electric angle, in response to the generation of the internal timing signal z, rotary/stationary transformation of the current command signals jq and jd is conducted by using the estimated electric angle, and two-phase/three-phase transformation is conducted to output the three-phase sinusoidal driving command signals ja, jb, and jc (the processes are the same as those of the flowchart of FIG. 11 and hence their detailed description is omitted). During a period when the internal count value V is changed by an amount corresponding to an electric angle of 360 degree, there are three falling edges of the pulse signal g. The deviation is detected at each of the timings of the falling edges, and, before there occurs the next falling edge, the time intervals of the generation of the internal timing signal z (the timer value Tt) are corrected so that the deviation becomes smaller.

The configurations and operations of the driving controller 22, the power supply unit 23, etc. are the same as those of the above-described embodiments. The sinusoidal driving currents Ia, Ib, and Ic which are proportional to the driving command signals ja, jb, and jc are supplied to the driving windings 20A, 20B, and 20C, whereby a torque which is less varied or is uniform is obtained so that the motor keeps on being smoothly rotated.

[Operation in the Start Process]

Figure 17:
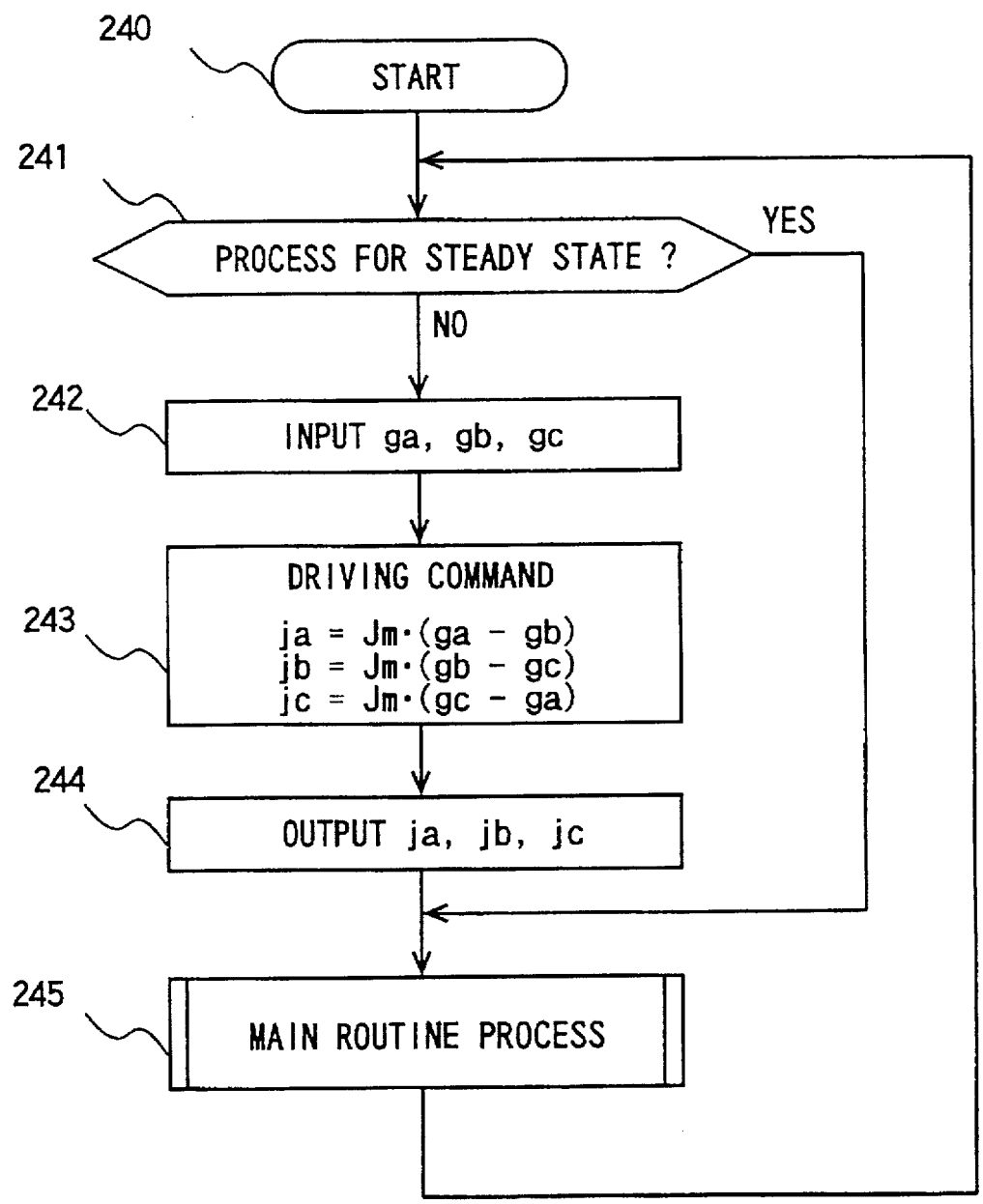
FIG. 17 is a second flowchart of the microcomputer 101 of the third embodiment.

Next, the operation in the start process will be described. FIG. 17 shows a flowchart of the microcomputer 101 in which also the start process is shown.

(1) Start process 240:

After the power source is turned on, this process is started.

(2) Judgement process 241:

It is judged whether a process for a steady state is currently conducted or not. If the motor is rotated and the present state is a steady rotation state in which the driving command signals are generated by using the measurement result signal f of the time interval measurement unit 42, the computer process proceeds to process 245. If the present state is a start state, the computer process proceeds to process 242 in which driving command signals for the start process are generated. The judgement on the steady rotation state is conducted based on, for example, repeated inputs of the second differential pulse y of the time interval measurement unit 42 in a predetermined time interval. If it is judged that the present current state is the start state, the interruption process using the internal timing signal z is not conducted.

(3) Input process 242:

The position signals ga, gb, and gc are input.

(4) Driving command generation process 243:

From the position signals ga, gb, and gc, the driving command signals ja, jb, and jc are generated in accordance with the following equations:

$$ja = Jm \cdot (ga - gb)$$
$$jb = Jm \cdot (gb - gc)$$
$$jc = Jm \cdot (gc - ga),$$

where ga, gb, and gc are 1 when they are "H" and 0 when they are "L." Consequently, ja, jb, and jc are changed so as to be in either of three states of Jm, 0, and −Jm. The waveforms of the driving command signals ja, jb, and jc in the start process are shown in (e), (f), and (g) of FIG. 18. In each waveform of FIG. 18, abscissa is graduated with time, and ordinate with signal amount.

(5) Output process 244:

The driving command signals ja, jb, and jc for the start process are D/A-converted and then output.

(6) Main routine process 245:

A required main routine process is conducted and the computer process then returns to judgement process 241. The processing amount in the main routine process is made as small as possible so that the generation of the driving command signal in the start process is not affected by the main process (according to circumstances, the main process may be omitted).

In the embodiment, the three-phase position signals ga, gb, and gc are positionally detected (position detection mechanism). The rectangular driving command signals ja, jb, and jc which vary in a stepwise manner are generated as the driving command signals for the start process by using the position signals ga, gb, and gc (start driving command signal generation mechanism). The motor is caused by the driving command signals for the start process to be surely rotated. During the rotation, the motor is smoothly rotated by the sinusoidal driving command signals ja, jb, and jc using the estimated electric angle. As a result, the motor start operation is stably surely conducted, and, during the rotation, a driving torque which is less varied or is uniform is obtained so that vibration and noises of the motor are reduced to a very low level.

In the embodiment, since the timing intervals of generation of the pulse signal g which is obtained by synthesizing the three-phase position signals ga, gb, and gc with each other are measured, the number of measurements per electric angle of 360 degree is tripled so that the estimation of the electric angle is conducted more correctly. Furthermore, the numbers of deviation detection operations and correction operations are tripled, and hence deviation is reduced to a very small degree. The acceleration/deceleration detection process 115 and the acceleration/deceleration correction process 116 which are shown in FIG. 10 may be inserted between the processes 235 and 236 in the flowchart of FIG. 16 of the embodiment, thereby conducting the acceleration/deceleration detection and correction processes. Also such a configuration is within the scope of the invention.

In the embodiment, the rotation detector 201 is configured by using the three detection devices which detect the fluxes of the permanent magnet. The invention is not restricted to this configuration. Alternatively, such a rotation detector may be used that a signal corresponding to the counter electromotive force generated in the three-phase driving windings during the steady rotation state is subjected to pulse shaping, thereby to obtain the position signals and the pulse signal (In the alternative, as described in the first embodiment, the driving currents may be switched with suitable periods in the start process). By employing such a configuration that the counter electromotive force generated in a driving winding is detected, a special detection device is no more necessary, and hence the structure of the motor is simplified.

[Embodiment 4]

Hereinafter, a fourth embodiment of the invention will be described with reference to the accompanying drawings.

Figure 19:
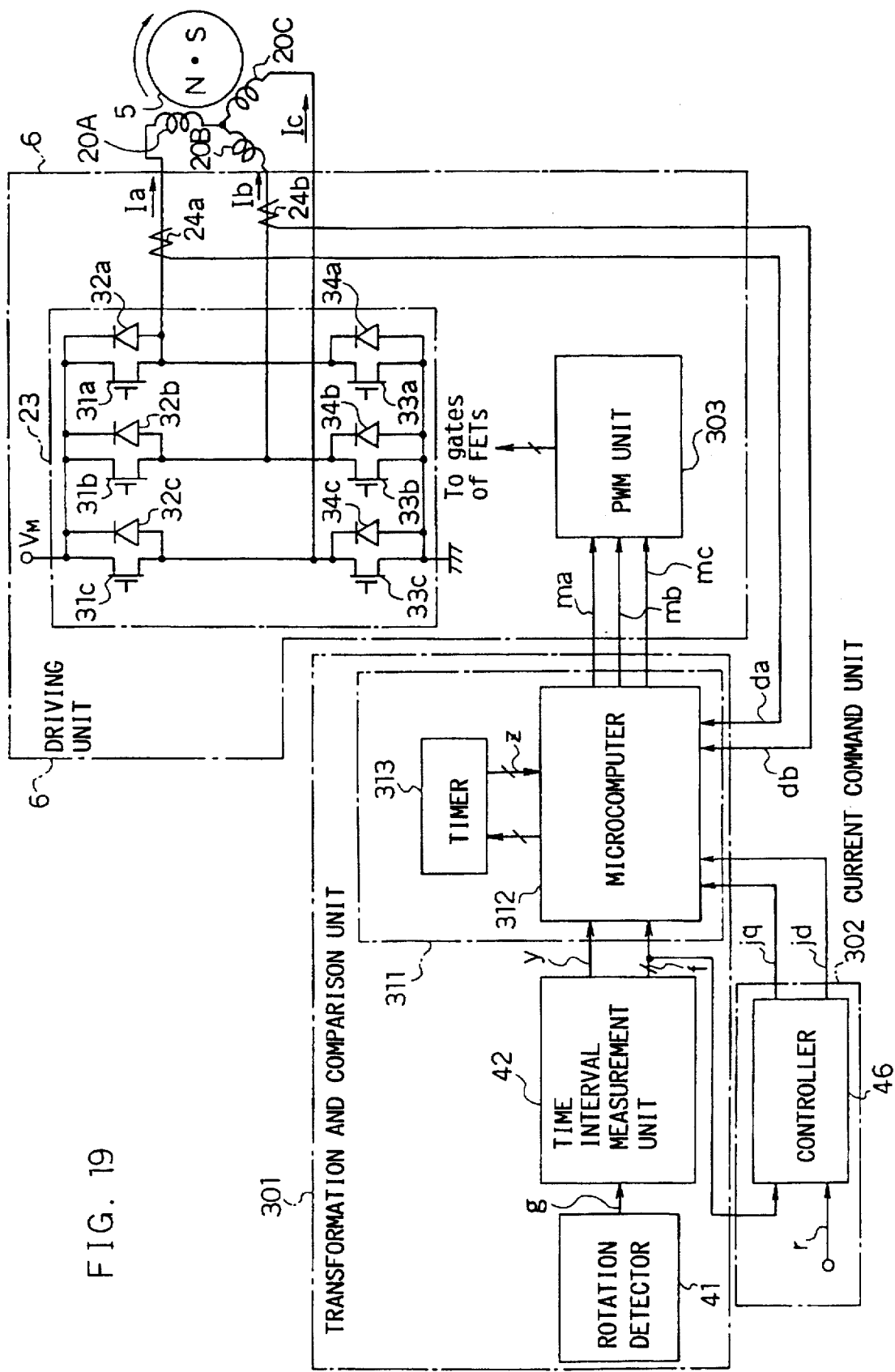
FIG. 19 is a circuit diagram of a fourth embodiment of the invention.

FIGS. 19 to 22 show a brushless motor of the fourth embodiment of the invention. FIG. 19 shows the circuit configuration of the brushless motor of the fourth embodiment (the components which are the same as those of the second embodiment are designated by the same reference numerals, and redundant duplicated descriptions are omitted). In the embodiment, a calculation unit 311 of a transformation and comparison unit 301 is configured by a microcomputer 312 and a timer 313. As described later, the calculation unit 311 receives current command signals jq and jd from a current command unit 302 and the current feedback signals da and db from the current detectors 24a and 24b, and performs a predetermined transformation/comparison calculation by using the estimated electric angle so as to conduct an error detection operation and a control calculation operation. A PWM unit 303 produces a PWM signal (Pulse-Width Modulation signal) from output signals ma, mb, and mc of the transformation and comparison unit 301, so as to control the ON/OFF operations of the driving transistors 31a, 31b, 31c, 33a, 33b, and 33c. The configurations and operations of the other portions are the same as those of the embodiment described above and hence their description is omitted. The motor of the embodiment has the same structure as that of FIG. 2.

The rotation detector 41 of the transformation and comparison unit 301 generates, by using the output signal of the detection device 17, the pulse signal g of a frequency which is proportional to the rotational speed of the rotor. The rotation detector 41 has the configuration shown in FIG. 3. The time interval measurement unit 42 measures the intervals of timings of the generation of the pulse signal g output from the rotation detector 41, and outputs the measurement result signal f and the second differential pulse y. The time interval measurement unit 42 has the configuration shown in FIG. 4.

Figure 20:
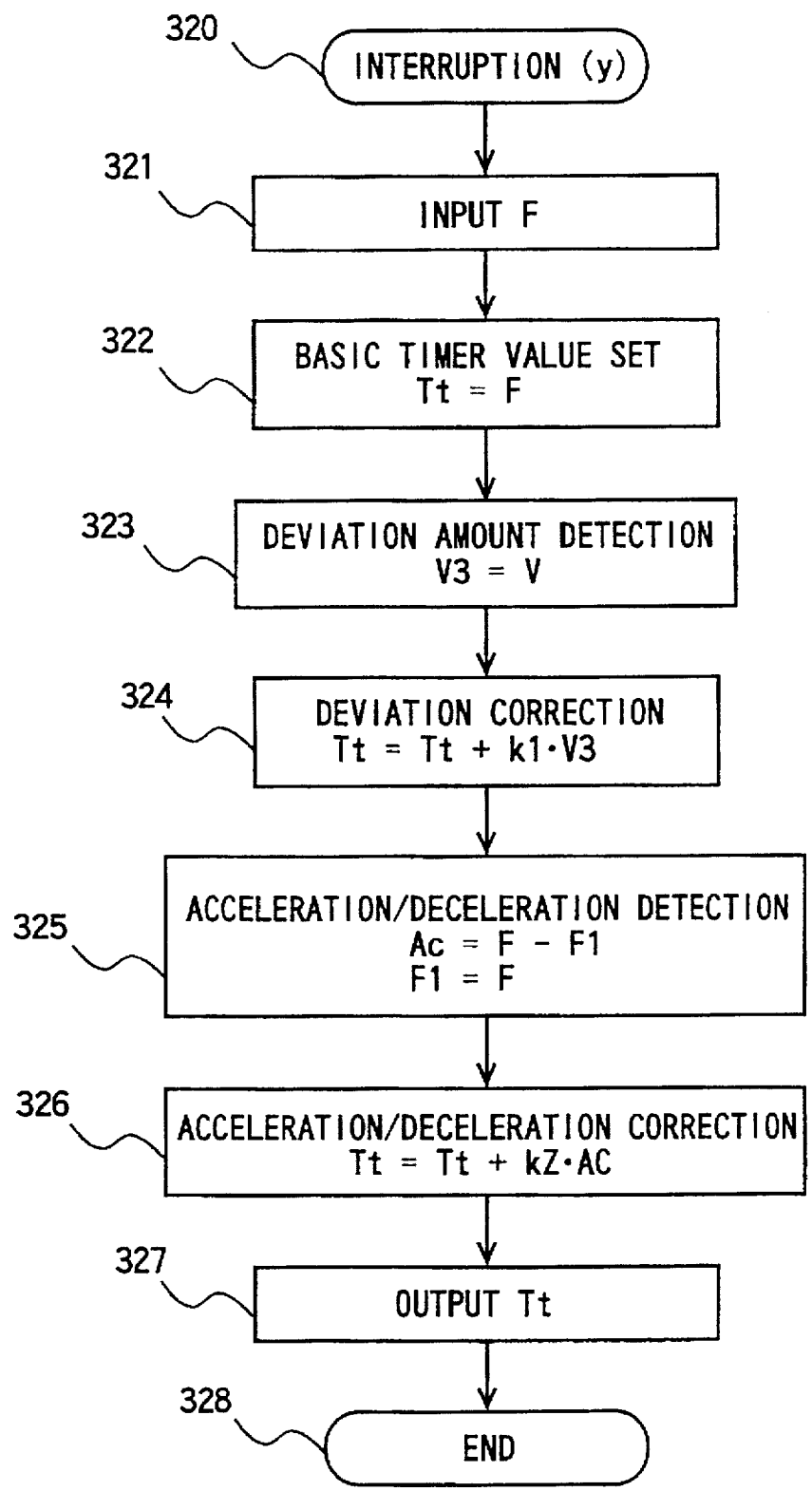
FIG. 20 is a first flowchart of a microcomputer 312 of the fourth embodiment.
Figure 21:
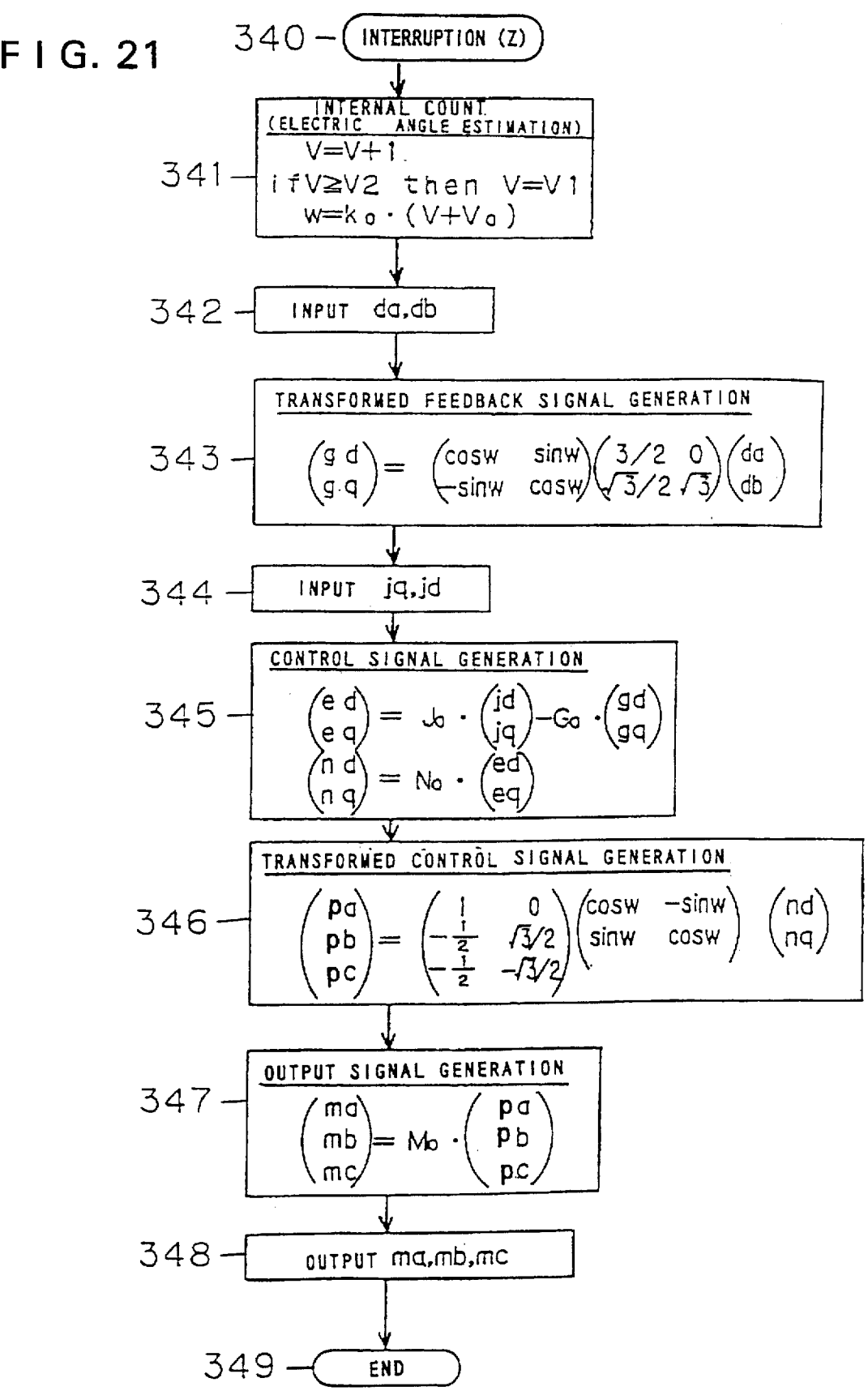
FIG. 21 is a second flowchart of the microcomputer 312 of the fourth embodiment.

The calculation unit 311 of the transformation and comparison unit 301 is configured by the microcomputer 312 and the timer 313, and receives the measurement result signal f and the second differential pulse y from the time interval measurement unit 42, the current command signals jq and jd from a current command unit 302, and the current feedback signals da and db from the current detectors 24a and 24b. The calculation unit conducts a predetermined calculation process to output the output signals ma, mb, and mc. FIGS. 20 and 21 show flowcharts of the microcomputer 312.

[Interruption Process of FIG. 20]

First, an interruption process of FIG. 20 using the second differential pulse y will be described (the contents of the process are the same as those shown in the flowchart of FIG. 10). This process is executed each time the time interval measurement unit 42 obtains a new measurement result.

(1) Interruption process 320:

When the second differential pulse y is generated, the following interruption process is conducted.

(2) Input process 321:

The measurement result signal f of the time interval measurement unit 42 is input, and its value is set as F.

(3) Basic timer value set process 322:

The measurement result F is set as the timer value Tt of the timer 313, that is, Tt=F.

(4) Deviation amount detection process 323:

The count value V (corresponding to the estimated electric angle) of an internal counter (described later) at this time is entered in V3, that is,

V3=V, so as to obtain the deviation from a predetermined value (zero) of the value of the internal counter. When the phase of the internal count value lags, V3 is negative, and, when the phase leads, V3 is positive.

(5) Deviation correction process 324:

The timer value Tt is corrected in accordance with the deviation V3, that is,

Tt=Tt+k1·V3, where k1 is a proportional coefficient. When the phase of the internal count value lags, V3 is negative, namely V3<0, and Tt is corrected so as to become smaller. When the phase of the internal count value leads, V3 is positive, namely V3>0, and Tt is corrected so as to become larger.

(6) Acceleration/deceleration detection process 325:

An acceleration/deceleration value Ac indicative of the acceleration/deceleration state of the rotor is calculated from a new measurement result F and the immediately previous measurement result F1. For the next process, F is then substituted into F1.

Ac=F-F1

F1=F.

During acceleration, F<F1, and hence the acceleration/deceleration value Ac is negative. During deceleration, F>F1, and hence the acceleration/deceleration value Ac is positive.

(7) Acceleration/deceleration correction process 326

In accordance with the acceleration/deceleration value Ac, the timer value Tt is corrected. Specifically, Tt=Tt+k2·Ac, where k2 is a proportional coefficient. During acceleration, Ac<0 and Tt is corrected so as to become smaller. During deceleration, Ac>0 and Tt is corrected so as to become larger.

(8) Output process 327 to the timer:

The timer value Tt is output to the timer 313 and held therein. The timer 313 conducts the down-count operation on the timer count using Tt as the load value. Each time the timer count reaches zero, the timer outputs the internal timing signal z to the microcomputer 312, and then continues the down-count operation with loading Tt. Consequently, the internal timing signal z can be obtained at internal timing intervals corresponding to the timer value Tt.

(9) Interruption termination process 328:

The interruption process is terminated.

[Interruption Process of FIG. 21]

Next, an interruption process of FIG. 21 using the internal timing signal z will be described. This process is executed each time the timer 313 generates the internal timing signal z.

(1) Interruption process 340:

When the internal timing signal z is generated, the following interruption process is conducted.

(2) Internal count (electric angle estimation) process 341:

The internal count value V corresponding to the estimated electric angle is incremented, that is,

V=V+1.

When V is equal to (or larger than) the second preset value V2, V is reset to the first preset value V1. The first preset value V1 is a negative value which corresponds to −180 degree in the term of an electric angle, and the second preset value V2 is a positive value which corresponds to {180 degree—(the angle corresponding to one count)}. Therefore, the internal count value V is counted up each time the internal timing signal z reaches, and repeatedly has a value between the first and second preset values V1 and V2. The electric angle w for transformation which has undergone the phase matching is calculated from the internal count value V.

$$w = k_0 \cdot (V + V_0),$$

where k0 is a proportional coefficient and V0 is an amount of the phase shift.

(3) Input process 342:

The current feedback signals da and db are A/D-converted and then supplied in the form of digital signals.

(4) Transformed feedback signal generation process 343:

The current feedback signals da and db are transformed by the coordinate transformation between the stationary coordinate and the rotational coordinate with the electric angle w, thereby to produce transformed feedback signals gd and gq, shown in the following equation (3):

$$\begin{pmatrix} gd \\ gq \end{pmatrix} = \begin{pmatrix} \cos w & \sin w \\ -\sin w & \cos w \end{pmatrix} \begin{pmatrix} 3/2 & 0 \\ \sqrt{3}/2 & \sqrt{3} \end{pmatrix} \begin{pmatrix} da \\ db \end{pmatrix}. \quad (3)$$

In the above-mentioned equation, the transformed feedback signals gd and gq are obtained directly from the two-phase current feedback signals da and db. This is equivalent to the case where the current feedback signal dc of the remaining one phase is obtained from the two-phase current feedback signals da and db, the signals da, db, and dc are subjected to the three-phase/two-phase transformation, and the coordinate transformation with the electric angle w is then conducted.

(5) Input process 344:

The current command signals jq and jd are input.

(6) Control signal generation process 345:

The current command signals jq and jd are compared with the transformed feedback signals gd and gq in accordance with the following equation to obtain error signals ed and eq:

$$\begin{pmatrix} ed \\ eq \end{pmatrix} = Jo \begin{pmatrix} jd \\ jq \end{pmatrix} - Go \begin{pmatrix} gd \\ gq \end{pmatrix}, \quad (4)$$

where Jo and Go are predetermined constants. Control calculation of the following equation is performed on the error signals ed and eq to obtain control signals nd and nq:

$$\begin{pmatrix} nd \\ nq \end{pmatrix} = No \begin{pmatrix} ed \\ eq \end{pmatrix}, \quad (5)$$

where No is a predetermined constant. (In the control calculation of [Ex. 5], the proportional control is conducted. Alternatively, the proportional integral control calculation or the proportional integral and differential control calculation may be performed.)

(7) Transformed control signal generation process 346:

The control signals nd and nq are transformed by the coordinate transformation between the rotational coordinate and the stationary coordinate with the electric angle w, thereby to produce transformed control signals pa, pb, and pc, shown in the following equation (6):

$$\begin{pmatrix} pa \\ pb \\ pc \end{pmatrix} = \begin{pmatrix} 1 & 0 \\ -1/2 & \sqrt{3}/2 \\ -1/2 & -\sqrt{3}/2 \end{pmatrix} \begin{pmatrix} \cos w & -\sin w \\ \sin w & \cos w \end{pmatrix} \begin{pmatrix} nd \\ nq \end{pmatrix}. \quad (6)$$

The above-mentioned equation corresponds to the process in which the control signals nd and nq are subjected to the coordinate transformation using the electric angle w and then to the two-phase/three-phase transformation.

(8) Output signal generation process 347:

The output signals ma, mb, and mc according to the transformed control signals pa, pb, and pc are obtained in accordance with the following equation:

$$\begin{pmatrix} ma \\ mb \\ mc \end{pmatrix} = Mo \begin{pmatrix} pa \\ pb \\ pc \end{pmatrix}, \quad (7)$$

where Mo is a predetermined constant.

(9) Output process 348:

The output signals ma, mb, and mc are D/A-converted and then output.

(10) Termination process 349:

The interruption process is terminated.

The current command unit 302 is configured by the controller 46 and supplies the two-phase current command signals jq and jd to the calculation unit 311 of the transformation and comparison unit 301. In the embodiment, the speed command signal r is compared with the measurement result signal f of the time interval measurement unit 42 and a predetermined speed control calculation is performed so as to make the difference between the signals zero, thereby obtaining the current command signals jq and jd.

Figure 22:
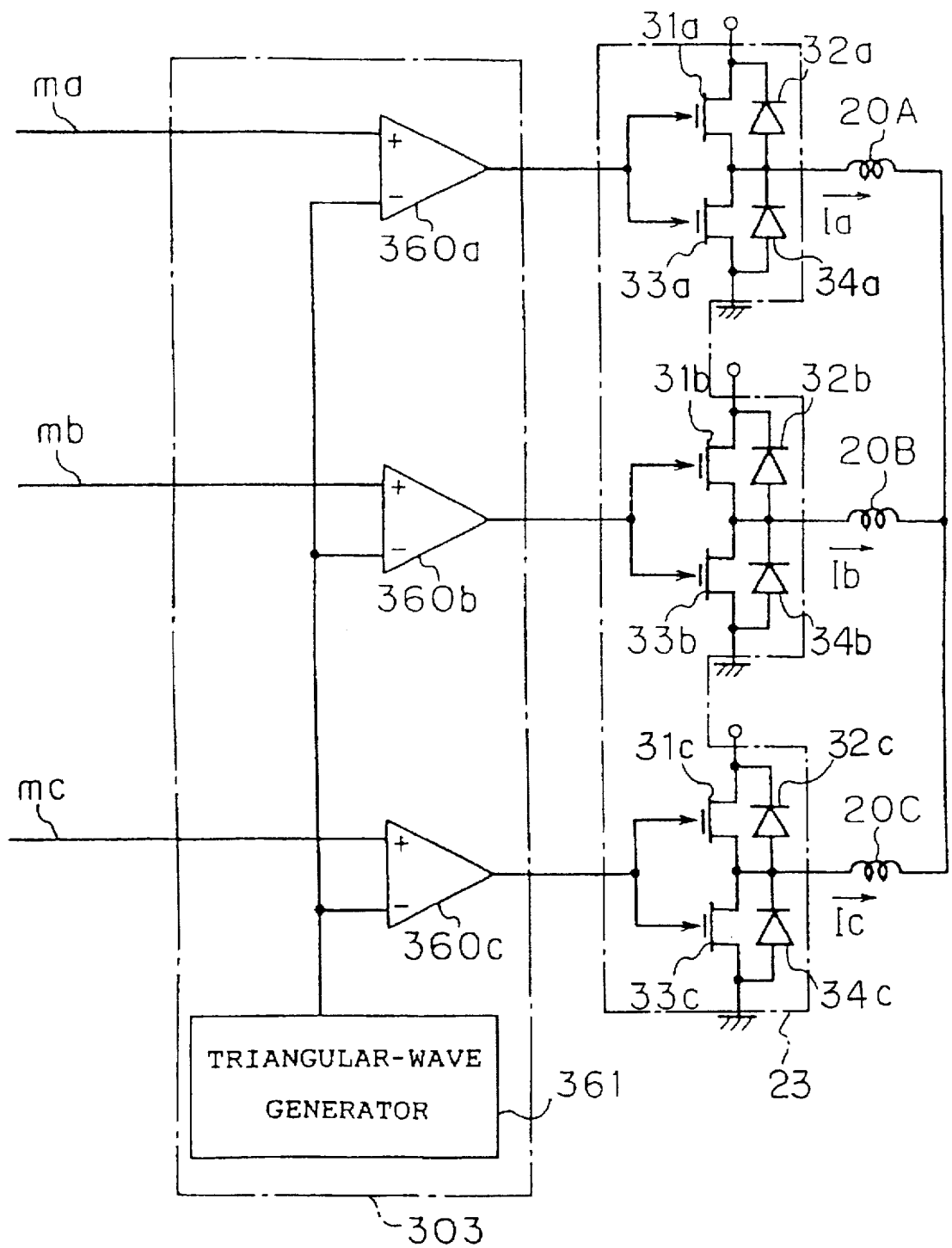
FIG. 22 is a circuit diagram of a PWM device 303 and a power supply unit 23 of the fourth embodiment.
Figure 23:
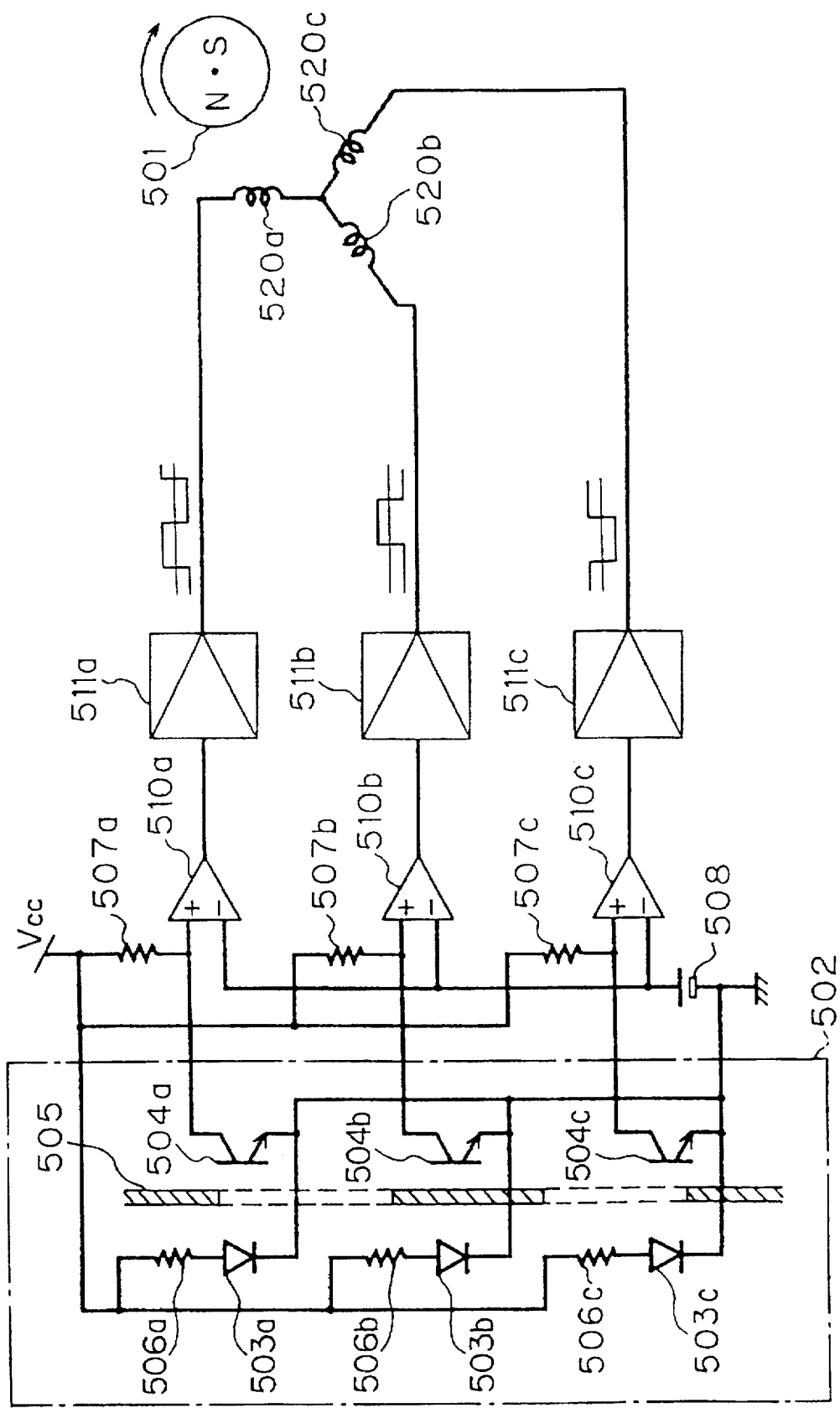
FIG. 23 is a diagram of a prior art brushless motor.

The output signals ma, mb, and mc of the transformation and comparison unit 301 are input to the PWM unit 303 so as to control the driving transistors. FIG. 22 shows the configuration of the PWM unit 303, and the connection among the power supply unit 23 and the driving windings 20A, 20B, and 20C. The PWM unit 303 is configured by comparators 360a, 360b, and 360c, and a triangular-wave generator 361. The comparator 360a compares the output signal ma of the transformation and comparison unit 301 with a triangular-wave signal of the triangular-wave generator 361 which has a predetermined frequency (about 20 kHz), and generates a PWM signal (Pulse-Width Modulation signal). The PWM signal of the comparator 360a controls the ON/OFF operations of the upper and lower driving transistors 31a and 33a so that the driving current Ia which is smoothed by the upper and lower diodes 32a and 34a and the driving winding is supplied to the driving winding 20A. Similarly, the comparator 360b compares the output signal mb of the transformation and comparison unit 301 with the triangular-wave signal of the triangular-wave generator 361, and generates a PWM signal, thereby controlling the ON/OFF operations of the upper and lower driving transistors 31b and 33b so that the driving current Ib which is smoothed by the upper and lower diodes 32b and 34b and the driving winding is supplied to the driving winding 20B. Similarly, the comparator 360c compares the output signal mc of the transformation and comparison unit 301 with the triangular-wave signal of the triangular-wave generator 361, and generates a PWM signal, thereby controlling the ON/OFF operations of the upper and lower driving transistors 31c and 33c so that the driving current Ic which is smoothed by the upper and lower diodes 32c and 34c and the driving winding is supplied to the driving winding 20C.

Therefore, a feedback loop is configured by the microcomputer 312 of the calculation unit 311 of the transformation and comparison unit 301, the PWM device 303, the power supply unit 23, the driving windings 20A, 20B, and 20C, and the current detectors 24a and 24b, so that the three-phase sinusoidal driving currents Ia, Ib, and Ic having an amplitude corresponding to the current command signals jq and jd are supplied to the driving windings 20A, 20B, and 20C (in the specification, the term of a sinusoidal driving current means that, in the case where the current command signals jq and jd are constant, the driving current varies sinusoidally in response to the change of the estimated electric angle).

In the embodiment, the deviation of the estimated electric angle at the timing of the generation of an edge of the pulse signal g is detected, and the time intervals of generating the internal timing signal are corrected on the basis of the deviation so that the estimated electric angle gradually coincides with a value synchronized with rotation of the rotor. At the same time, the time intervals of generating the internal timing signal are corrected on the basis of the acceleration/deceleration value Ac detected from the acceleration/deceleration state of the rotor of the rotor, in such a manner that, during acceleration, the time intervals are made shorter, and, during deceleration, the time intervals are made longer. According to this configuration, also the estimated electric angle in the acceleration/deceleration state of the rotor coincides very well with the rotational position of the rotor so that a torque which is less varied or is uniform is obtained.

These correction processes may be omitted at any time. When the deviation correction process 324 of FIG. 20 is omitted, for example, only the acceleration/deceleration correction is operated. When the acceleration/deceleration correction process 326 is omitted, only the deviation correction process is operated. When both the deviation correction process 324 and the acceleration/deceleration correction process 326 are omitted, all the correction processes are not operated. Alternatively, the deviation correction process may be simplified so that the estimated electric angle is directly corrected to a predetermined value at the timing of the generation of the pulse signal g (in the alternative, the flowchart of FIG. 20 is replaced with that of FIG. 12).

When the brushless motor of the embodiment is to be started, the three-phase output signals ma, mb, and mc which are changed with predetermined periods are supplied to the PWM unit 303 by a start process program (not shown) of the microcomputer 312 of the transformation and comparison unit 301, and the driving currents to the driving windings 20A, 20B, and 20C are forcedly switched, thereby causing the rotor to be rotated in a predetermined direction. As the rotation of the rotor advances, the pulse signal g of the rotation detector 41 is generated and the time interval measurement unit 42 is activated so that the operation is transferred to the steady driving operation in which the steady sinusoidal driving currents are supplied (at this time, the start process program is stopped). Also in the embodiment, in the same manner as the third embodiment, a plurality of position detection devices may be used so that the rotational position signals ga, gb, and gc corresponding to the rotational position of the rotor are obtained and the three-phase output signals ma, mb, and mc of the transformation and comparison unit 301 are changed in the start process in accordance with the rotational position signals ga, gb, and gc (in the flowchart of FIG. 17, for example, the start process is conducted with replacing ja, jb, and jc with ma, mb, and mc), and the driving currents to the driving windings 20A, 20B, and 20C are forcedly switched. Also such a configuration is within the scope of the invention (in the steady rotation state, sinusoidal driving currents are supplied by the above-described operations).

The calculation process of the embodiment which is shown in the flowchart of FIG. 21 may be variously modified. For example, the current control calculation of the control signal generation process 345 may be of the proportional integral type, or a compensation signal which cancels the effect of the counter electromotive force (speed electromotive force) may be used in the control signal generation process 345 or the output signal generation process 347. Also such a configuration is within the scope of the invention.

In the embodiment, the rotation detector 41 is configured by using the detection device which detects the fluxes of the permanent magnet. The invention is not restricted to this configuration. Alternatively, it is possible to use a rotation detector which detects a signal corresponding to the counter electromotive force (speed electromotive force) generated in a driving winding of one phase. Also such a configuration is within the scope of the invention.

In the embodiments described above, the brushless motors have three-phase driving windings. The invention is not restricted to this configuration. According to the invention, generally, a brushless motor having K-phase driving windings (K is an integer not less than 2) can be configured. In a motor structure having two-phase driving windings, for example, the signals hq and hd may be used as driving command signals so that driving currents which are proportional to the signals hq and hd are supplied. The time interval measurement unit may measure the generation timing intervals of both falling and rising edges of the pulse signal, in place of those of falling edges only. The measurement result of the time interval measurement unit may be subjected to the simple averaging process, the weighted averaging process, or the filtering process, and then used as a preset value of the timer. The power supply unit may not conduct the PWM driving operation, and the driving voltage may be changed in an analog manner. In place of MOS FETs, bipolar transistors, IGBTs, and the like may be used as the driving transistors. The structure of the motor is not restricted to the above-described one in which a permanent magnet is embedded into a ferromagnetic yoke. Alternatively, a permanent magnet may be exposed on the surface and opposed to the stator core. The driving windings of the stator may be wound in such a manner that one winding is wound on one salient pole. In other words, the manner of arranging the driving windings is not restricted to that described above. Instead of detecting fluxes of permanent magnets, a part for detecting rotation may be disposed as another structural component. The detection device is not restricted to a megnetoelectrical transformation device and a detection device of another detection principle may be used. When a rotation detector which obtains a pulse signal by detecting a signal according to one- or three-phase counter electromotive forces (speed electromotive forces) generated in the driving windings is used, it is not required to use a special detection device. The controller is not restricted to one which conducts a speed control. For example, the controller may output the current command signal as a result of a torque control or a position control (when there already exist the current command signals, the controller is not necessary). The current command signal is not required to be supplied in the form of two signals and may be supplied in the form of, for example, a single signal. The calculation equations for obtaining the driving command signal and the driving currents are not restricted to those described above. For example, also signals which are smoothly changed in accordance with the estimated electric angle such as those of a trapezoidal wave (for example, the positive and negative slope portions on the sides are at an electric angle of about 60 degree), and a triangular wave (for example, the positive and negative slope portions on the sides are at an electric angle of about 90 degree) are within the scopes of the sinusoidal driving command signal and the sinusoidal driving currents in the invention, as has been defined in the last sentence of the foregoing paragraph entitled "Object and summary of the Invention". The step number of the electric angle is not restricted to that described above (it is preferable to have a resolution of 10 degree or smaller in terms of an electric angle and hence 36 steps (=360 degree/10 degree) or more are preferable). In the acceleration/deceleration detection, it is not required to use the measurement result of the time interval measurement unit. For example, a change of the speed command signal r may be used, or an acceleration command may be directly produced and then used. In the embodiments, the driving transistors are controlled in accordance with a result of a comparison between the three-phase driving command signals and the three-phase current feedback signals. The invention is not restricted to this configuration. For example, a configuration may be employed in which driving command signals for two phases are compared with feedback signals for the two phases to produce error signals for the two phases, a predetermined current control calculation is conducted on the error signals to obtain control signals for the two phases, a control signal for the remaining one phase is produced by adding the control signals for the two phases to each other and inverting the sign of the addition result, and the driving transistors are controlled in accordance with the thus-produced comparison error signals for three phases. In order to improve the accuracy of the current control, the current control calculation may be of the proportional integral type, or a compensation signal which cancels the effect of the counter electromotive force (speed electromotive force) may be used. The calculations using the estimated electric angle are not restricted to those of the embodiments and may be variously modified. In addition, various modification may be done without departing the spirit of the invention, and it is a mater of course that such modifications are within the scope of the invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A brushless motor comprising:

a field means having a permanent magnet type rotor for producing P field poles (P is an even number integer not less than 2);

K-phase driving windings (K is an integer not less than 2) fixed to a stator;

driving commanding means for generating a substantially sinusoidal driving command signal; and driving control means for supplying a substantially sinusoidal driving current to said driving windings responding to said driving command signal, said driving commanding means comprising:

rotation detecting means for obtaining a pulse signal in synchronization with rotation of said rotor;

time interval measurement means for measuring a timing interval of said pulse signal; and driving command generating means for estimating an estimated electric angle at an estimating interval shorter than said timing interval and responsive to a measurement result of said time interval measurement means, and generating the substantially sinusoidal driving command signal corresponding to said estimated electric angle.

2. A brushless motor in accordance with claim 1, wherein said driving command generating means comprises:

electric angle estimating means for obtaining a generated timing signal at a time interval responding to the measurement result of said time interval measurement means, and estimating the estimated electric angle responding to generation of the generated timing signal; and command generating means for generating the substantially sinusoidal driving command signal corresponding to the estimated electric angle.

3. A brushless motor in accordance with claim 1, wherein said driving command generating means comprises:

electric angle estimating means for obtaining a generated timing signal at a time interval responding to the measurement result of said time interval measurement means, and estimating the estimated electric angle responding to generation of the generated timing signal; and command generating means for generating the substantially sinusoidal driving command signal corresponding to the estimated electric angle;

deviation amount detecting means for detecting a deviation of the estimated electric angle from a predetermined value at a timing of the pulse signal in said rotation detecting means; and deviation correcting means for, in accordance with the deviation, correcting the time interval of the generated timing signal.

4. A brushless motor in accordance with claim 1, wherein said driving command generating means comprises:

electric angle estimating means for obtaining a generated timing signal at a time interval responding to the measurement result of said time interval measurement means, and estimating the estimated electric angle responding to generation of the generated timing signal; and command generating means for generating the substantially sinusoidal driving command signal corresponding to the estimated electric angle; and deviation correcting means for correcting the estimated electric angle to a predetermined value at a timing of the pulse signal in said rotation detecting means.

5. A brushless motor in accordance with claim 1, wherein said driving command generating means comprises:

electric angle estimating means for obtaining a generated timing signal at a time interval responding to the measurement result of said time interval measurement means, and estimating the estimated electric angle responding to generation of the generated timing signal; and command generating means for generating the substantially sinusoidal driving command signal corresponding to the estimated electric angle;

acceleration/deceleration detecting means for detecting an acceleration/deceleration state of said rotor; and acceleration/deceleration correcting means for, in accordance with an output of said acceleration/deceleration detecting means, correcting the time interval of the generated timing signal.

6. A brushless motor in accordance with claim 1, wherein said driving command generating means comprises:

electric angle estimating means for obtaining a generated timing signal at a time interval responding to the measurement result of said time interval measurement means, and estimating the estimated electric angle responding to generation of the generated timing signal; and command generating means for generating the substantially sinusoidal driving command signal corresponding to the estimated electric angle;

deviation amount detecting means for detecting a deviation of the estimated electric angle from a predetermined value at a timing of the pulse signal in said rotation detecting means; and deviation correcting means for, in accordance with the deviation, correcting the time interval of the generated timing signal;

acceleration/deceleration detecting means for detecting an acceleration/deceleration state of said rotor; and acceleration/deceleration correcting means for, in accordance with an output of said acceleration/deceleration detecting means, correcting the time interval of the generated timing signal.

7. A brushless motor in accordance with claim 1, wherein said driving commanding means further comprises:

position detecting means for generating a rotational position signal corresponding to a rotational position of said rotor; and start driving command generating means for, in a start process, generating the driving command signal in accordance with the rotational position signal.

8. A brushless motor in accordance with claim 1, wherein said driving commanding means uses said rotation detecting means for obtaining the pulse signal corresponding to a counter electromotive force generated in said driving windings during rotation.

9. A brushless motor comprising:

a field means having a rotor for producing P field poles (P is an even number not less than 2);

K-phase driving windings (K is an integer not less than 2) fixed to a stator;

driving commanding means for generating a substantially sinusoidal driving command signal; and driving control means for obtaining a current feedback signal corresponding to a current supplied to said driving windings, and supplying a substantially sinusoidal driving current to said driving windings in accordance with a result of comparison between the driving command signal and the current feedback signal, said driving commanding means comprising:

rotation detecting means for obtaining a pulse signal in synchronization with rotation of said rotor;

time interval measurement means for measuring a timing interval of said pulse signal;

electric angle estimating means for obtaining a generated timing signal at a time interval responding to the measurement result of said time interval measurement means, and estimating the estimated electric angle responding to generation of the generated timing signal; and command generating means for generating the substantially sinusoidal driving command signal corresponding to the estimated electric angle;

deviation amount detecting means for detecting a deviation of the estimated electric angle from a predetermined value at a timing of the pulse signal in said rotation detecting means; and deviation correcting means for, in accordance with the deviation, correcting the time interval of the generated timing signal.

10. A brushless motor in accordance with claim 9, wherein said driving commanding means further comprises:

acceleration/deceleration correcting means for, in accordance with an output of said acceleration/deceleration detecting means, correcting the time interval of the generated timing signal.

11. A brushless motor in accordance with claim 9, wherein said driving commanding means further comprises:

position detecting means for generating a rotational position signal corresponding to a rotational position of said rotor; and start driving command generating means for, in a start process, generating the driving command signal in accordance with the rotational position signal.

12. A brushless motor according to claim 9, wherein said driving commanding means uses said rotation detecting means for obtaining the pulse signal corresponding to a counter electromotive force generated in said driving windings during rotation.

13. A brushless motor comprising:

a field means having a permanent magnet type rotor for producing P field poles (P is an even number not less than 2), K-phase driving windings (K is an integer not less than 2) fixed to a stator;

current commanding means for generating a current command signal;

current detecting means for obtaining a current feedback signal corresponding to a current supplied to said driving windings;

transforming and comparing means for comparing the current feedback signal with the current command signal; and driving control means for supplying a substantially sinusoidal driving current to said driving windings in accordance with an output signal of said transforming and comparing means, said transforming and comparing means comprising:

rotation detecting means for obtaining a pulse signal in synchronization with rotation of said rotor;

time interval measurement means for measuring a timing interval of said pulse signal;

electric angle estimating means for obtaining a generated timing signal at a time interval responding to a measurement result of said time interval measurement means, and estimating an estimated electric angle responding to generation of the generated timing signal;

transform feedback means for obtaining a transformed feedback signal by operating coordinate transformation on the current feedback signal with the estimated electric angle;

control signal generating means for obtaining a control signal responding to a result of comparison between the transformed feedback signal and the current command signal;

transformed control signal generating means for obtaining a transformed control signal which is obtained by operating coordinate transformation on the control signal with the estimated electric angle; and output generating means for obtaining the output signal responding to the transformed control signal.

14. A brushless motor in accordance with claim 13, wherein said transforming and comparing means further comprises:

deviation amount detecting means for detecting a deviation of the estimated electric angle from a predetermined value at a timing of the pulse signal in said rotation detecting means; and deviation correcting means for, in accordance with the deviation, correcting the time interval of the generated timing signal.

15. A brushless motor in accordance with claim 13, wherein said transforming and comparing means further comprises:

deviation correcting means for correcting the estimated electric angle to a predetermined value at a timing of the pulse signal in said rotation detecting means.

16. A brushless motor in accordance with claim 13, wherein said transforming and comparing means further comprises:

acceleration/deceleration detecting means for detecting an acceleration/deceleration state of said rotor; and acceleration/deceleration correcting means for, in accordance with an output of said acceleration/deceleration detecting means, correcting the time interval of the generated timing signal.

17. A brushless motor in accordance with claim 13, wherein said transforming and comparing means further comprises:

position detecting means for generating a rotational position signal corresponding to a rotational position of said rotor; and means for, in a start process, changing the output signal of said transforming and comparing means responding to the rotational position signal.

18. A brushless motor in accordance with claim 13, wherein said transforming and comparing means uses said rotation detecting means for obtaining the pulse signal corresponding to a counter electromotive force generated in said driving windings during rotation.

* * * * *